(12) United States Patent
Beresford-Wood et al.

(10) Patent No.: US 9,171,333 B2
(45) Date of Patent: Oct. 27, 2015

(54) DUE DILIGENCE SYSTEMS WITH INTEGRATED INDICATION OF REQUIRED ACTION

(75) Inventors: Bret Beresford-Wood, Lafayette, CA (US); Amanda Grosse, New York, NY (US); Adam Ross, South Orange, NJ (US); Kevin Asuncion, Oakland, CA (US); Tom Solodyna, Maynard, MA (US); Eric Folkemer, New York, NY (US)

(73) Assignee: NASDAQ, INC., New York, NY (US)

( * ) Notice: Subject to any disclaimer, the term of this patent is extended or adjusted under 35 U.S.C. 154(b) by 0 days.

(21) Appl. No.: 13/543,617

(22) Filed: Jul. 6, 2012

(65) Prior Publication Data

US 2014/0012614 A1    Jan. 9, 2014

(51) Int. Cl.
*G06Q 10/06* (2012.01)
*G06Q 40/00* (2012.01)

(52) U.S. Cl.
CPC .................................... *G06Q 40/12* (2013.01)

(58) Field of Classification Search
CPC ... G06Q 10/10; G06Q 10/06; G06F 17/30088
See application file for complete search history.

(56) References Cited

U.S. PATENT DOCUMENTS

| | | | |
|---|---|---|---|
| 6,950,982 B1* | 9/2005 | Dourish | 715/234 |
| 2002/0059131 A1* | 5/2002 | Goodwin et al. | 705/37 |
| 2004/0201622 A1* | 10/2004 | Rhodes et al. | 345/751 |
| 2013/0185198 A1* | 7/2013 | Lorch | 705/39 |

OTHER PUBLICATIONS

U.S. Appl. No. 13/543,564, filed Jul. 6, 2012.

* cited by examiner

*Primary Examiner* — Thomas Dixon
(74) *Attorney, Agent, or Firm* — Nixon & Vanderhye P.C.

(57) ABSTRACT

A system for performing due diligence on electronically stored documents is provided. A dynamic due diligence item (DDDI) is created by one user and associated with a particular document or piece of information by the system. The created DDDI is assigned to another user. The created DDDI is then routed by the system over a computer network to another user for review of the DDDI and the associated particular document or piece of information. In certain instances, after receiving the notification and opening the document, the system may enforce upon the second user a required action when the DDDI is presented.

26 Claims, 25 Drawing Sheets

Assignor Screens

Starting View - No Annotation Yet

Assignee Screens

Assignment Alerting Tool

Activated Alerts
Shows # of alerts

Clickable Navigation
Clicking the alert area takes user to the next instance of an Assignment made within the document.

August 5, 2011
The Forrester Wave™: Mobile Collaboration
by Ted Schadler
with Matthew Brown and Heather Martyn

EXECUTIVE SUMMARY

Mobile collaboration means putting collaboration workloads onto all-important smartphones and tablets, then delivering a great user experience anywhere, anytime, on any device. This is a high bar to clear, but we found 13 vendors able to clear it. In Forrester's 15-criteria evaluation of mobile collaboration vendors, we found that Adobe, Box, Cisco, IBM, salesforce.com, SugarSync, Skype, and Yammer led the pack because of their commitment to tablets and smartphone platforms as well as a strategy aligned with the needs of the mobile workforce: low latency, cloud reach, and platform support. We also found many Strong Performers ----AT&T, Citrix, Dropbox, Evernote, and Google. In this handpicked group of mobile collaboration vendors, no vendor slipped into the Contender or Risky Bet categories ---- at least as it relates to mobile support.

TABLE OF CONTENTS
2 Mobile Collaboration Requires A New App Approach

NOTES & RESOURCES
Forrester conducted product evaluations in May 2011 and interviewed 13 vendor companies;

FIG. 6A

Figure 6C:
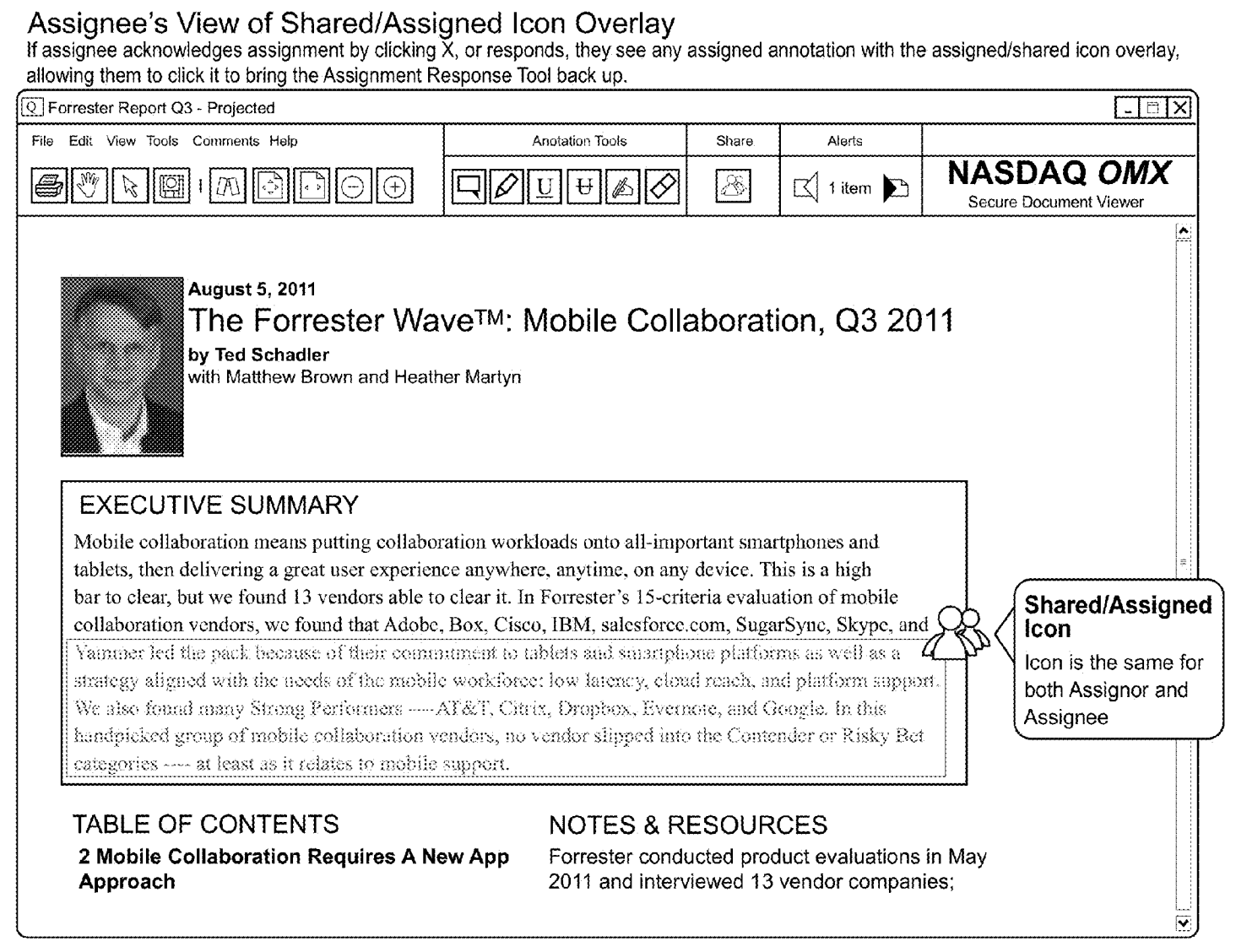

Assignee's View of Shared/Assigned Icon Overlay
If assignee acknowledges assignment by clicking X, or responds, they see any assigned annotation with the assigned/shared icon overlay, allowing them to click it to bring the Assignment Response Tool back up.

Figure 6E:
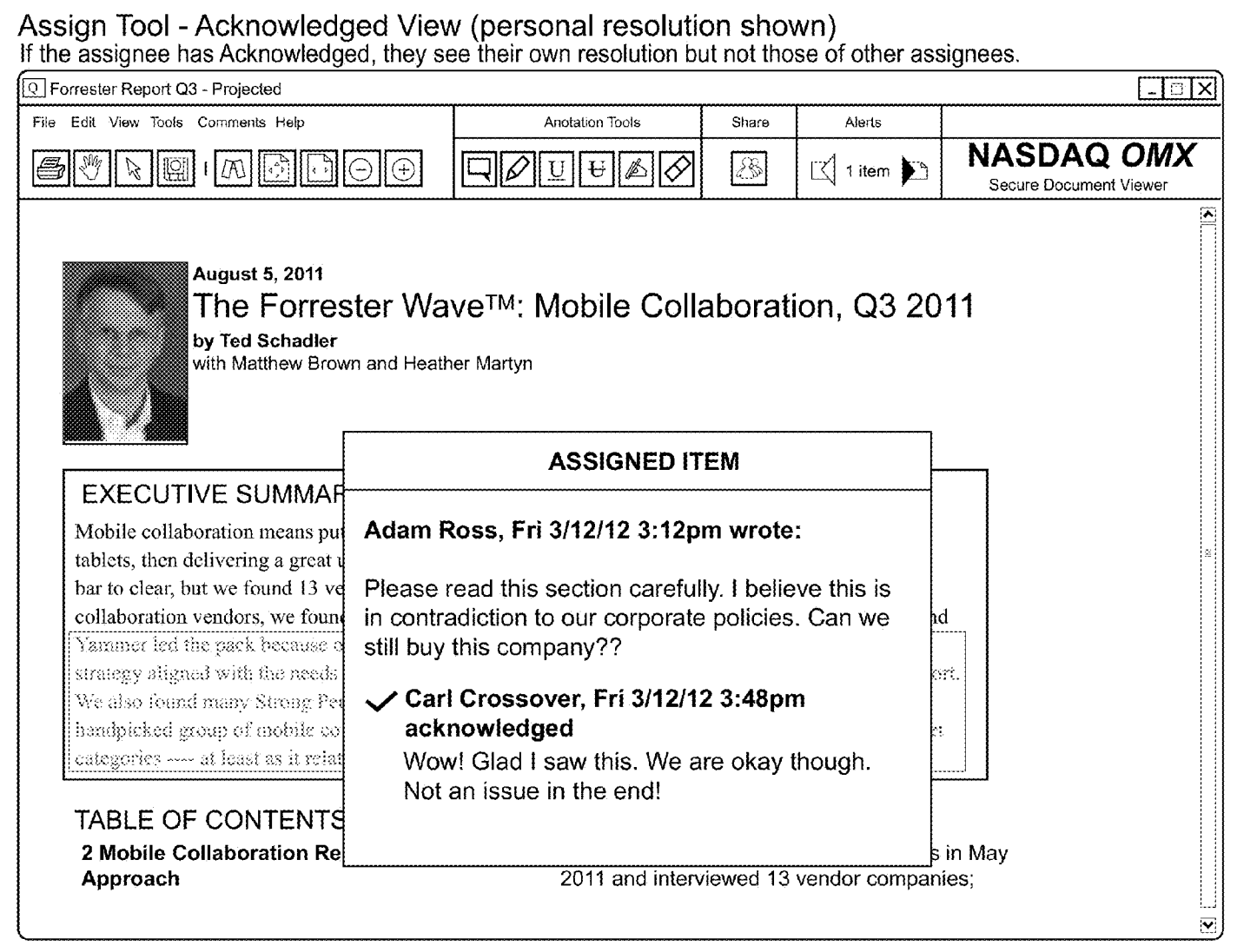

Assign Tool - Acknowledged View (personal resolution shown)
If the assignee has Acknowledged, they see their own resolution but not those of other assignees.

NASDAQ OMX IntelliVault℠

| Home | Documents | Secure Email | Address Book |

Search: _____

Advanced Search

1.2.1.4 Customer Contracts
Folder contains list of customer contracts as well as fillable forms that we send to our contracts.

☐ Project Phoenix
  ☐ 1 Business
    ☐ 1.1 Products & Services
      ☐ 1.1.1 SAAS Offering
      ☐ 1.1.2 Software Offering
    ☐ 1.2 Customers & Vendors
      ☐ 1.2.1 Customers
        ☐ 1.2.1.4 Customer Contracts ← 804
      ☐ 1.2.2 Vendors
    ☐ 1.3 Insurance
  ☐ 2 Technology *
    ☐ 2.1 Systems Architecture
  ☐ 3 Financials
    ☐ 3.1 2011
    ☐ 3.2 2010
    ☐ 3.3 2009
  ☐ 4 Tax
    ☐ 4.1 IRS Lawsuit Special Folders:
  ☆ My Favorites List
  ☐ Newly Added Documents Team-Intel℠  ○ Off  ● On
Showing Insight for: All Groups
Configure.
▨ Low Interest (or no data)
▨ Interest among team members
▨ Intense Interest among team members (?) Need Help? Contact the 24/7 Help Desk

[Upload]   [New...]

Sort By: [Index Number ▾]

| | | | | |
|---|---|---|---|---|
| ✓ | 1.2.1.4.1 | Standard Terms & Conditions * <br> 32 pages, added 3/4/11 by Juliette B. <br> This is our standard customer contract, which we use for a lot of things | ▨ 0 | 0:32 total |
| | 1.2.1.4.2 | ACPF Order Form <br> 5 pages, added 3/2/11 by Juliette B. | ▨ 1 | 1:24 total |
| ✓ | 1.2.1.4.3 | 2010 Customer Receivables * <br> 138 pages, added 3/2/11 by John A. <br> Grid of our receivables. | ▨ 8 | 3:45 total |
| ✓ | 1.2.1.4.5 | Bear Stearns Customer Revocation Letter <br> 32 pages, added 3/4/11 by Juliette B. <br> This is our standard customer contract, which we use for a lot of things | ▨ 0 | 0:32 total |
| | 1.2.1.4.6 | Simms Lumber Contract <br> 5 pages, added 3/4/11 by Juliette B. | ▨ 2 | 2:24 total |
| | 1.2.1.4.7 | Customer Contract Application (online) <br> 5 pages, added 3/2/11 by Juliette B. | ▨ 3 | 1:24 total |
| ✓ | 1.2.1.4.8 | Generic Contract Cost Calculator * <br> 138 pages, added 3/2/11 by John A. <br> This should be opened in Excel as it contains various macros that help you understand... | ▨ 6 | 12:42 total |

800 →
802

DUE DILIGENCE SYSTEMS WITH INTEGRATED INDICATION OF REQUIRED ACTION

TECHNICAL OVERVIEW

The technology herein relates to systems and methods that facilitate the performance of due diligence in an electronic environment. More particularly, the technology herein relates to virtual data rooms where users can access documents and other information in performing dynamic due diligence.

INTRODUCTION

At an individual level, we all weigh various factors as to whether a particular action should be taken. For example, when shopping at a grocery store, we may look at the ingredients on a carton of ice cream, determine which brand of milk to purchase, or test whether or not a pineapple is ripe. All of these inquires relate to making an informed decision or purchase given our particular needs and desires. Companies and individuals) also make similar types of inquires when an action is to be taken. Collectively, such inquiries into the overall action can be referred to as "due diligence."

Due diligence includes research, analysis, and other inquiries into matters related to a particular action. Accordingly, due diligence is usually more than just document review. It relates to research and identifying source documents coming up with a process of deciding what (or whether) a particular action should be taken or determining the value of the business (or asset) being acquired. Thus, due diligence may relate to understanding what is in a document (or information) with a specific goal in mind.

One example of due diligence is in the area of mergers and acquisitions (M&A) where looking at the assets, liabilities (debt), and other issues for the proposed transaction are virtual requirements before a transaction can be completed. However, review/research/analysis of this nature can be time consuming as there may be thousands of documents, large databases of information, or other items that need to be reviewed before a transaction can be carried out.

A conventional approach to performing due diligence in such situations may be fairly static where the documents are physically placed into one room. Then access to that room is controlled. Lawyers, accountants, and other individuals or teams may then be allowed access the room to review/analyze all of the collected information. However, the inventors recognized such an approach has several problems.

For example, there is no or very little integrity checking to determine what has actually been reviewed out of the thousands of documents in the room. A further problem is that even if access is controlled to the room, there is no enforcement scheme to ensure the documents stay intact. As one example, one person may discover a had piece of "evidence" for their side and may take actions (e.g., ripping or tearing up the page) to destroy the evidence. Thus, key pieces of information that affect the overall due diligence process may be tainted, altered, or destroyed.

Moreover, because the documents are physically located, the people responsible for performing due diligence must physically travel to the location of the documents and information.

Virtual data rooms (VDR) have been created to allow companies and individuals to conduct due diligence in a virtual environment. VDRs may be an attractive alternative because of cost-savings and other advantages (e.g., allowing multiple people to view a document simultaneously). However, problems are still associated with the use of such conventional virtual data rooms.

In a VDR environment, User A may share a document with User B by sending him an email message to review the document. However, simply sending a message to review a document does not provide control over the document or dictate how users interact with the document. This may lead to certain questions (e.g., of relevance in a due diligence environment) being unanswered. For example, did User B review the document or not? Did User B review the page of the document that user A had a question about? Did user B respond is some actionable way to User A's request? Does user A know that user B reviewed the page? Leaving these and other questions unanswered may lead to adverse consequences. Accordingly, new techniques for carrying out or facilitating clue diligence in an electronic environment are still needed.

SUMMARY

In certain example embodiments, due diligence workflows may be created as part of a virtual data room. In certain instances, such due diligence workflows may be dynamic due diligence items (DDDI) that allow an initiating user to both share a document (or other piece of information) with a receiving user and request or require the receiving user to respond in some meaningful way. In other words, a receiving user that receives a due diligence item related to a document may be required to acknowledge or take some other affirmative action before the system allows the receiving user to proceed with other tasks (e.g., such as viewing the remainder of the shared document).

In certain example embodiments, a system for performing due diligence on a plurality of documents is provided. The plurality of documents are electronically stored and accessible to a plurality of users over a computer network. The plurality of users includes a first user and a second user and a storage medium system is configured to store the plurality of documents. The system also includes a processing system with at least one processor. The processing system is configured to receive a request from a first dynamic due diligence terminal associated with a first user to view a document in the plurality of documents. The processing system is configured to retrieve the document from the storage medium system. The processing system is configured to display the retrieved document at the first dynamic clue diligence terminal for review by the first user. The processing system is configured to select at least the second user out of the plurality of users based on user input. The processing system is configured to create a dynamic due diligence item including for use in performing clue diligence on the retrieved document. The processing system is configured to assign the created dynamic due diligence item to at least the second user. The processing system is configured to associate the created dynamic due diligence item to the document. The processing system is configured to store the created dynamic due diligence item to the storage medium system. The processing system is configured to display the document at a second dynamic due diligence terminal for review by the second user. The processing system is configured to integrate an indication of the dynamic due diligence item into the displayed document. The processing system is configured to display the dynamic due diligence item at the second dynamic due diligence terminal, the dynamic due diligence item including a required action that the second user is required to take in order to satisfy the dynamic due diligence item. The processing system is configured to receive input from the second user, via the second dynamic due diligence terminal, responsive to display of the dynamic due diligence item. The processing system is configured to generate and store an indication, to the storage medium system, that the dynamic due diligence item is satisfied when the received input from the second user is in accordance with the required action of the dynamic due diligence item.

In certain aspects, the required action includes an acknowledgement by the second user of the assignment to the second user.

In certain implementations, the first dynamic due diligence terminal includes a first processor of the at least one processors. The second dynamic due diligence terminal is remotely located from the first terminal and includes a second processor of the at least one processors. The processing system includes the first dynamic due diligence terminal, the second dynamic due diligence terminal, and a server system that includes at least a third processor of the at least one processors. The first and second dynamic due diligence terminals are configured to communicate with the server system over the computer network.

An aspect includes encrypting the stored documents and decrypting a document before display on a terminal.

In certain examples, a notification is sent to a second user that a dynamic due diligence item has been created.

In certain example embodiments, the processing system is further configured to annotate a portion of the document based on input from a user. The annotated portion of the document is then associated with the created dynamic due diligence item.

An aspect includes obscuring at least some of the annotated portion with the presentation of the DDDI at least until the required action is input by the second user. In certain instances a DDDI includes comments that have been provided by the first or second users. Such comments are then displayed. An aspect includes assigning the DDDI from among a list of users that are authorized to have DDDIs assigned to them.

In certain examples, the processing system is configured to receive recommendations on a document stored by the system wherein the recommendation may be for a portion of the document. A recommendation may have multiple different levels. In certain implementations, A recommendation score is calculated and displayed based on all recommendations associated with the document.

A non-transitory computer readable medium storing computer readable instructions for use with a virtual data room system for conducting dynamic due diligence on information that is segmented into a plurality of different information portions that are stored in a storage medium system that is remotely accessible to a plurality of users is provided. The plurality of users include a first user and a second user. The stored instructions comprise instructions configured to receive a first request from a first computing resource that is associated with the first user to retrieve an information portion of the plurality of different information portions stored in the storage medium system. The stored instructions comprise instructions configured to transmit the requested information portion to the first computing resource for review by the first user. The stored instructions comprise instructions configured to select a group of users from the plurality of users based on the requested information portion and/or the first user, the group of users including the second user. The stored instructions comprise instructions configured to receive, from the first computing resource, a created dynamic due diligence item for use in performing due diligence on the information portion. The stored instructions comprise instructions configured to store the created dynamic due diligence item to the storage medium system. The stored instructions comprise instructions configured to store, to the storage medium system, an assignment of the dynamic due diligence item to the second user. The stored instructions comprise instructions configured to store, to the storage medium system, an association between the created dynamic due diligence item and the requested information portion. The stored instructions comprise instructions configured to receive a second request from a computing resource that is associated with the second user to retrieve the information portion that is associated with the created dynamic due diligence item. The stored instructions comprise instructions configured to transmit the information portion to a computing resource used by the second user for review thereon. The stored instructions comprise instructions configured to retrieve the dynamic due diligence item from the storage medium system, the dynamic due diligence item set to be integrated into the information portion when displayed to the second user on the computing resource, the dynamic due diligence item including an input requirement that the second user is required to take in order to satisfy the dynamic due diligence item. The stored instructions comprise instructions configured to store an indication, to the storage medium system, that the input requirement of the dynamic due diligence item is satisfied when data transmitted from the computing resource indicates that the second user provided input that is in accordance with the input requirement.

A method of conducting due diligence on a plurality of files by a plurality of remotely connected users is provided. The plurality of files are stored on a storage medium system of a virtual data room system that includes at least one processor. The plurality of files includes a first file and the plurality of remotely connected users includes a first user and a second user. A first request is received, at the virtual data room system, from the first user using a first remote computer system to view the first file stored in the storage medium system. The requested first file is transmitted from the virtual data room system to the first remote computer system for review by the first user. A created dynamic due diligence item is received at the virtual data room system for conducting due diligence on the first file, the created dynamic due diligence item being associated with the first file and assigned to at least the second user. The created dynamic due diligence item is stored in the storage medium system via the at least one processor. A second request is received from the second user to view the first file that is associated with the created dynamic due diligence item. The first file is transmitted from the virtual data room system to a second remote computer system for review by the second user thereon. The dynamic due diligence item is retrieved, via the at least one processor, from the storage medium system. The dynamic due diligence item is set to be integrated into the first file when displayed to the second user on the second remote computer system. The dynamic due diligence item includes an input requirement that the second user is required to take in order to satisfy the dynamic due diligence item. An indication is stored, to the storage medium system, that the input requirement of the dynamic due diligence item is satisfied when data transmitted from the second remote computer system indicates that the second user provided input that is in accordance with the input requirement.

The above features may be combined to form additional embodiments and sub-elements of certain embodiments may form further embodiments.

Related feature are described in commonly assigned, U.S. patent application entitled "COLLABORATIVE DUE DILI- GENCE REVIEW SYSTEM," (attorney docket number 4010-237), the entire contents of which are hereby incorporated by reference. Such features may form additional embodiments.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 4A-4F are screen shots showing the creation of an annotation according to an example implementation;

FIGS. 6A-6E are screen shots showing the exemplary assignee interaction with an example system;

FIG. 8-10 are screen shots of an example recommendation workflow; and

DETAILED DESCRIPTION

A dynamic due diligence item (DDDI) is created and used by users of a system. For example, users may interact with a virtual data room (VDR) to create, modify, review, etc. a DDDI that is associated with a particular document or other piece of information stored in the VDR.

Figure 1:
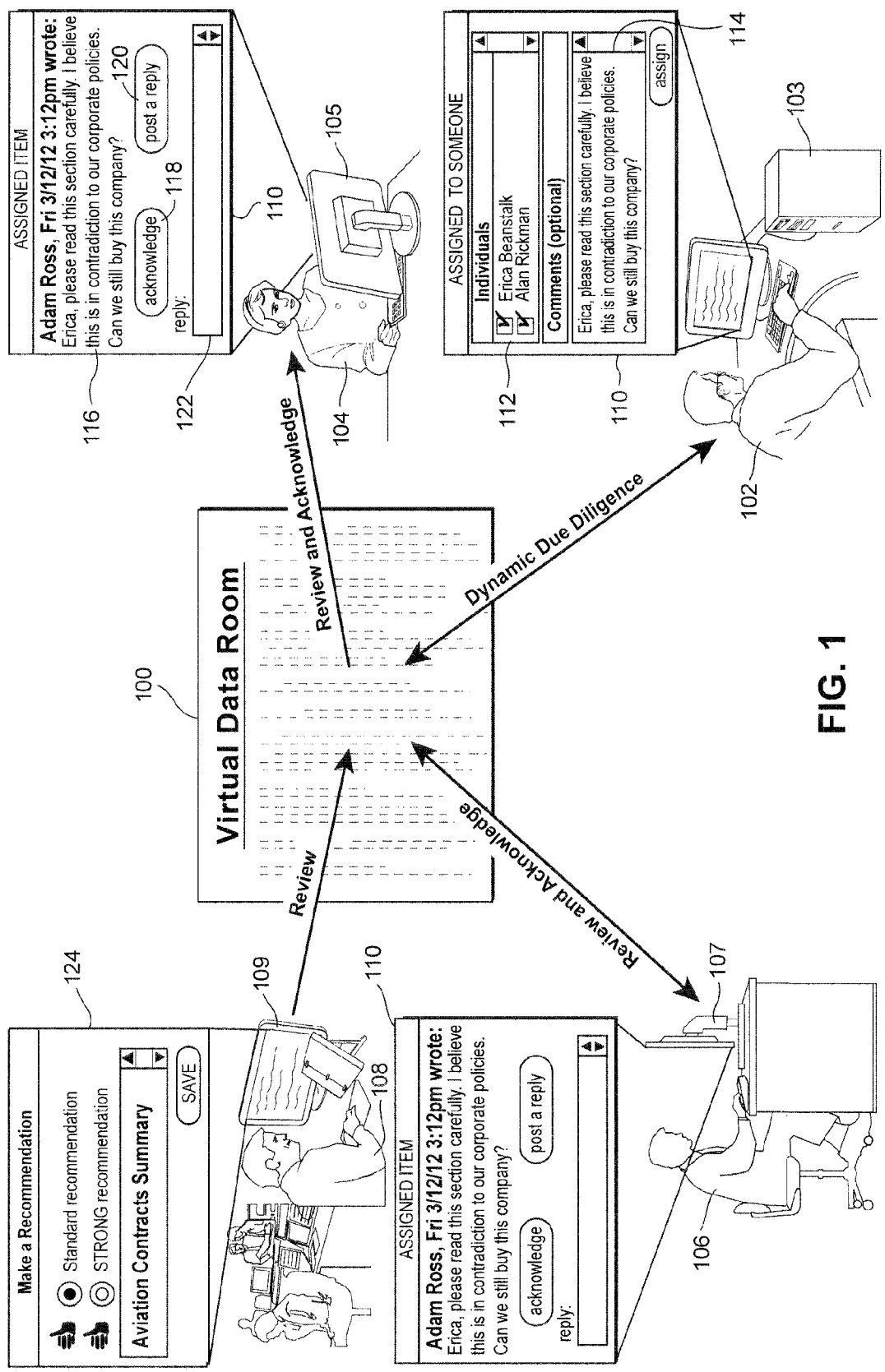
FIG. 1 depicts users performing due diligence tasks via an exemplary virtual data room.

FIG. 1 depicts users performing due diligence tasks via an exemplary virtual data room. A virtual data room 100 is provided to multiple users that includes an initiating user 102 (Adam Ross), a receiving user 104 (Erica Beanstalk), a receiving user 106 (Alan Rickman), and recommendation user 108. The virtual data room 100 is implemented on a computing system (e.g., as described herein) such as a server system that may be centrally located or located in a distributed environment. In certain example embodiments, the virtual data room 100 may be provided via a cloud service or other services that may provide on demand computing resources. The virtual data room 100 may provide functionality that facilitates or allows users to perform due diligence tasks. The virtual data room 100 may include files, documents, information (e.g., account database, sales history databases, software code repositories, etc.), and the like that the users of the system access to carry out their due diligence.

In FIG. 1, initiating user 102 is reviewing a document that is provided via the virtual data room 100 via a client system 103 (e.g., a due diligence terminal). As discussed in greater detail below, a client system may be a computing resource that is a personal computing device, a mobile device, or any other type of computing system that allows the user to access (e.g., remotely) information stored in the virtual data room 100.

When reviewing a document on client system 103, initiating user 102 decides to create a new workflow 110 (e.g., a DDDI) associated with the document being reviewed by the initiating user 102. The new workflow 110 includes a list of users 112 to assign the workflow to and an optional comments section 114. Initiating user 102 selects Erica and Alan as the users assigned to the workflow and then includes a brief note so that the users receiving the workflow may have some context for the received workflow.

The newly created workflow 110 is saved with the virtual data room 100 which then notifies both Erica and Alan that a workflow is now assigned to them. When the workflow 110 is saved to the virtual data room 100, additional processing may take place to store information related to the workflow 110 into a database or other storage medium so that the save information may be retrieved at a later time.

Notification of a workflow may be carried via, for example, email with a link to the workflow and the document that the workflow is associated with. In certain example embodiments, the context of the workflow may be displayed to the users in the form of a notification with an instruction to retrieve the document at a later date. For example, if a notified user is using a mobile device (e.g., with a small display), it may not be practical to completely review the requested document. Thus, only the comment associated with the created workflow may be displayed.

In any event, the workflow 110 is then retrieved and opened by Erica and Alan via respective client systems 105 and 107. The retrieved work flow 110 is displayed with information concerning who created the workflow (e.g., Adam), any comments 116 associated with the workflow, and actionable buttons 118 and 120. In certain example embodiments, a user that has a workflow assigned to them may be required to interact with an actionable item (e.g., button 118 or 120) before the portion of the document in question that the workflow is associated with may be displayed to the user. The workflow 110 may also include a reply text field that allows users to input reply comments to the originally assigning user (in this example Adam). Receiving users 104 and 106 may acknowledge 118 the assigned workflow 110. This acknowledgement is then stored with the virtual data room 100 for future use.

Managers or other supervisors may use the stored information to determine how well a particular due diligence process is proceeding. Such views may be collected and presented to more senior level managers to provide a quick overview of the progress being made (e.g., 50% of the documents have been reviewed, or that the legal department has 15 DDDIs that are open or un-resolved). Such reporting may allow for quicker re-tasking of resources or determining who is working and who is not.

FIG. 1 also shows a recommendation user 108 interacting with a computing system 109 to review information from virtual data room 100. During this information review, the user may decide to recommend (described in greater detail below) the document to other users of the virtual data room system. Such a recommendation may include multiple different levels. For example, a standard recommend and a "Strong" recommendation. In certain example embodiments, comments may be included as part of the recommendation process. Such recommendations are then stored and associated with particular documents, pieces of information, or section of documents for later review. For example, a summary may be presented to users of the cumulative recommendations made by users of the virtual data room system (or some subset thereof—e.g., the legal department). Users viewing such information can quickly see if there are certain documents that are strongly recommended by other users of the system. In certain instances, such a recommendation system may function as a non-directed workflow to encourage (rather than require) other users to review/interact with certain documents.

The initiating user 102 may also associate a type of action that he wants an assigned/receiving user to take with the document (or portion thereof). Such actions may include, for example, acknowledging (e.g., via button 118), posting a reply (e.g., via button 120), having the assigned user respond to a question (e.g., a yes/no question, or the like). Such actions may be combined to allow, for example, a reply response to via button 120 to automatically register an acknowledgement response with the virtual data room system 100.

Also, the responses and recordation of how users interact with exemplary workflows may be analyzed and/or collated for review. For example, the manager of a department may be able to keep track of employees to make sure they are reviewing and acknowledging documents.

In certain example embodiments, other types of actions may be tracked by the virtual data room 100. For example, each time a particular document or file is opened by a user, the virtual data room 100 may record such information. In another implementation, the page numbers or how long particular page was viewable on a screen may be recorded. For example, the virtual data room 100 may record that Erica, receiving user 104, had page 46 of an environmental impact statement displayed to her for 30 minutes. This information may then be reported upon at a later date (e.g., to confirm that a document was reviewed, or a particular passage in the document was reviewed).

In sum, users 102, 104, 106, and/or 108 may interact with the virtual data room system 100 in order to carry out dynamic due diligence on the information/documents stored in the virtual data room 100.

Figure 2:
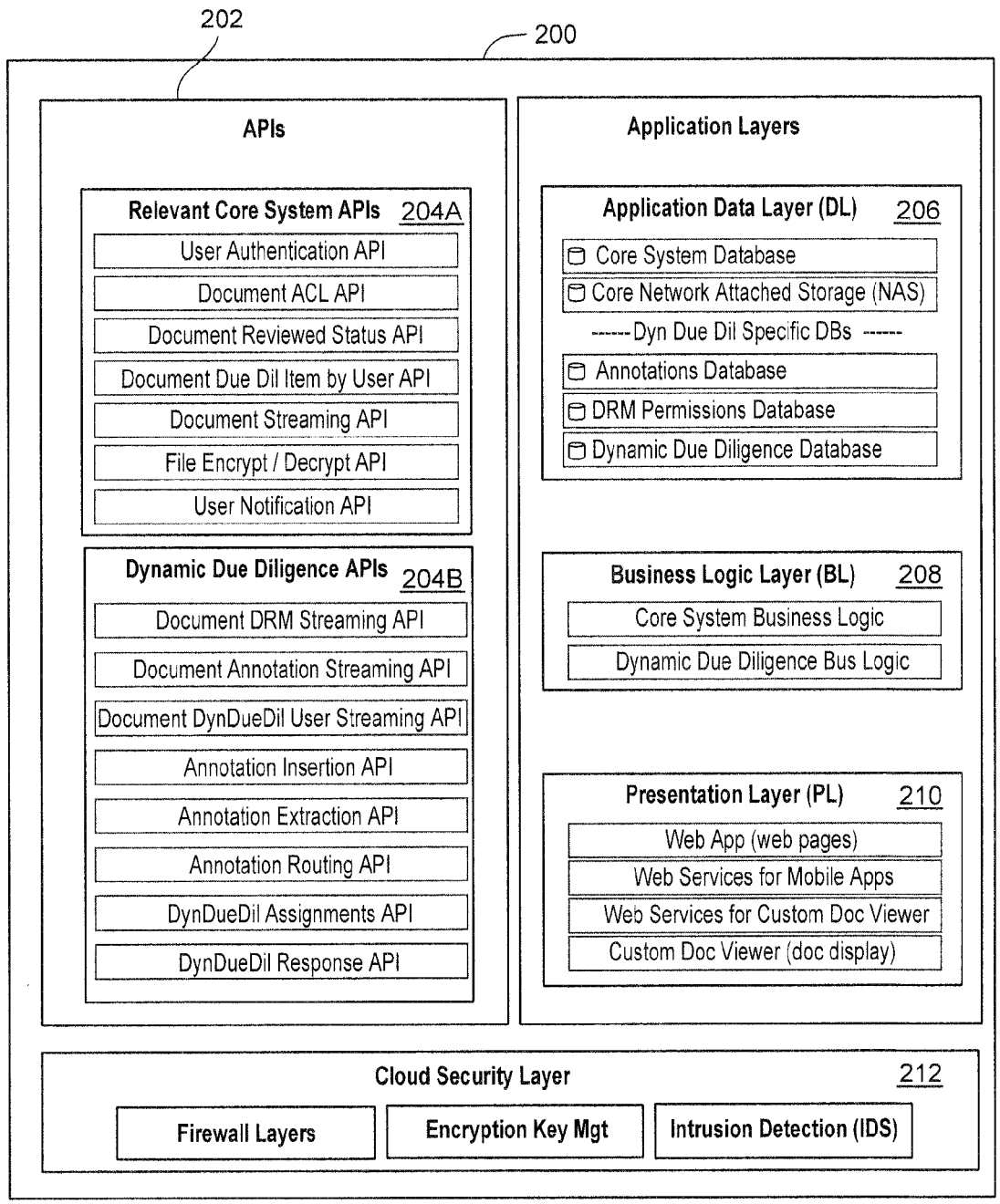
FIG. 2 is an example architecture diagram of a due diligence system.

FIG. 2 is an example architecture diagram for a computer implemented due diligence system. A due diligence system 200 includes various application programming interfaces (APIs) 202 (e.g., software) that configures or programs a processor (e.g., a CPU of a processing system) to function in a certain manner. In particular, the various APIs and other associated components shown in FIG. 2 may be stored in memory of a computing system and loaded by a processing system for execution. In certain example embodiments, the APIs may be located or run on a server system (e.g., that hosts the virtual data room) and/or a client system (e.g., operated by a user). APIs 202 may include core system APIs 204A that may provide core or basic functionality for accessing system resources and communicating with client system. APIs 202 may also include dynamic due diligence APIs 204B that provide dynamic due diligence functionality to the system. For example, the document annotation streaming API of the Dynamic due diligence APIs may operate to stream annotation information to a client where the annotation information is then integrated with the presentation of a document or other piece of information to the user on the client system.

The due diligence system 200 also includes layers such as the application data layer 206, the business logic layer 208, and the presentation layer 210. These layers may include software components that configure processing systems to carry out certain tasks.

The application data layer 206 may include data access logic and/or mediums that store data related to the dynamic due diligence system 200. For example, the core system database may store information regarding documents and/or information that are associated with a particular due diligence project. The annotations database may store annotations created by users (e.g., 114 in FIG. 1) for particular documents or portions of documents.

The business logic layer 208 provides business logic functionality. For example, the dynamic due diligence business logic may act to enforce a particular requirement that an acknowledgement is received before allowing a user to view a given document.

The presentation layer 210 may include components that allow users to view documents, information, etc via different mediums. In certain example embodiments, web services for mobile applications may provide functionality for handheld devices (e.g., smart phones). In certain example embodiments, a custom view may be used to present the information to a user. In certain example embodiments, a web page interface may be used by users to access, view, and/or interact with the system. In certain example embodiments, the functionality of the various presentation layers may vary depending on the client system that is accessing the due diligence system 200. For example, document viewing may be available only through a custom document viewer while other layers may present reduced functionality (e.g., because they are less secure).

In other words, in certain example embodiments, the dynamic due diligence system 200 may be provided via a three-tier architecture (data access, business logic, and presentation). It will be appreciated by those skilled in the art that other architecture models (e.g., multitier or N-tier architecture, MVC, or the like) may be employed to implement the techniques, processes, methods, etc described herein.

The due diligence system 200 may also include a cloud security layer 212. This layer may include functionality for preventing unauthorized access to information that is maintained by the due diligence system 200.

Figure 3:
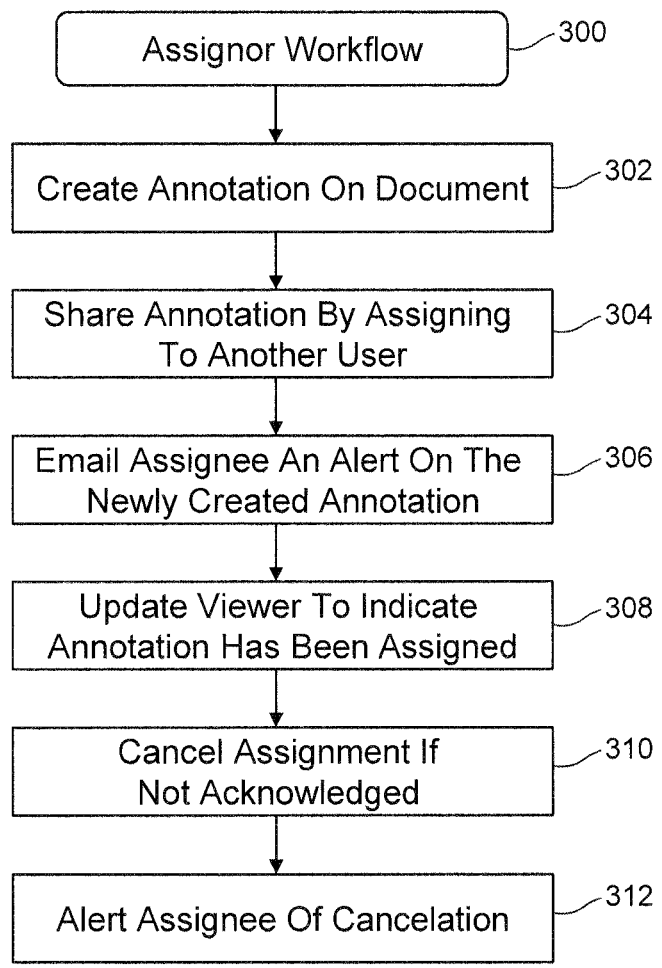
FIG. 3 is a flow chart of an example process associated with the creation of an annotation.

FIG. 3 is a flow chart of an example process associated with the creation of an annotation. FIGS. 4A-4F are screen shots showing the creation of an annotation according to an example implementation.

An assignor workflow 300 begins with a user reviewing a document. For example, the "The Forrester Wave™: Mobile Collaboration, Q3 2011" document shown in FIG. 4A. In step 302, the user creates an annotation for the document being reviewed. In certain example embodiments, an annotation is created and associated with a given document (or piece of information) as a whole. As an example, a user may review a document concerning the estimated valuation of a company's patent portfolio. The user may then create an annotation (and associated workflow or dynamic due diligence item) that is associated with the whole document.

Figure 4A:
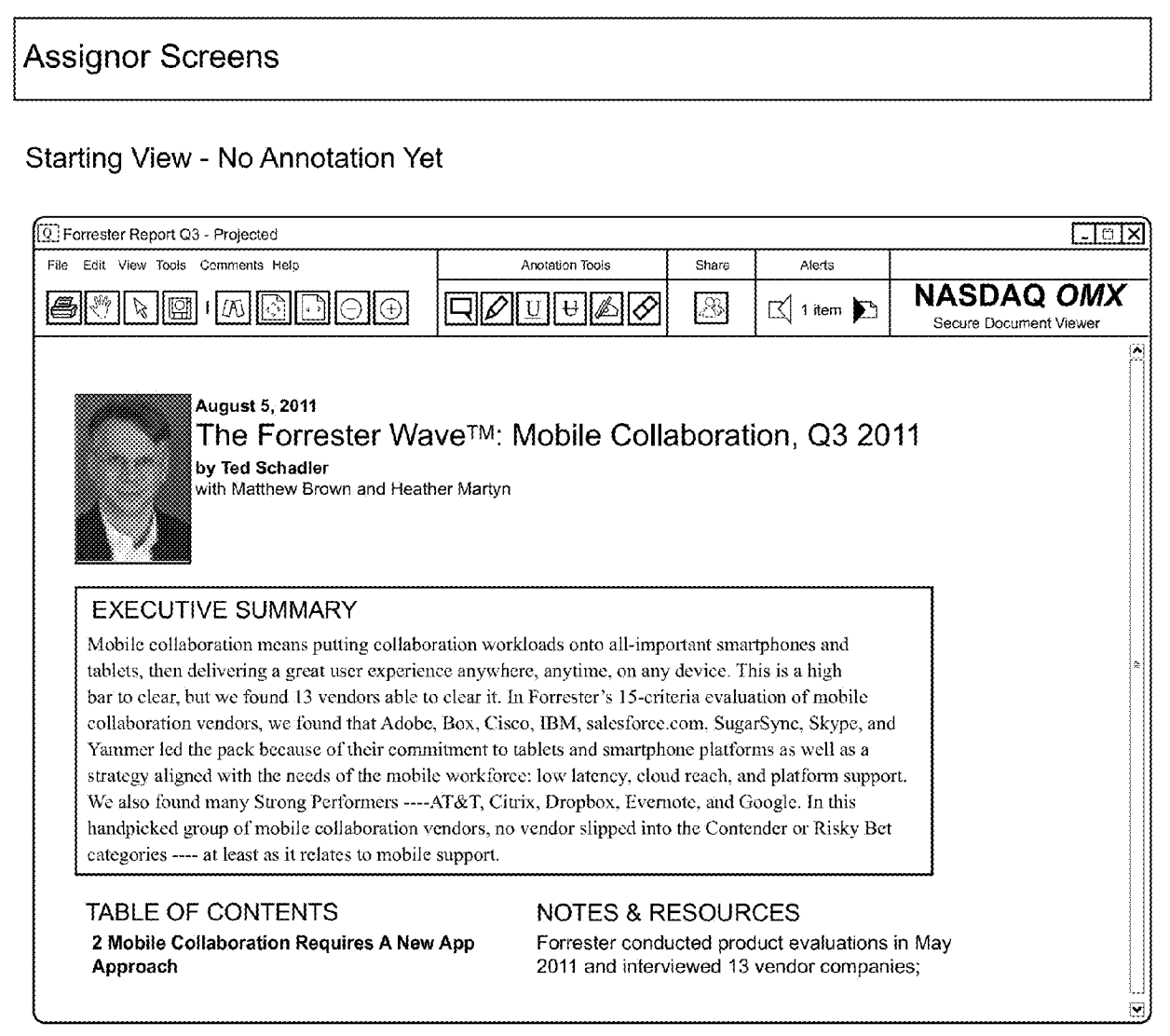
Figure 4B:
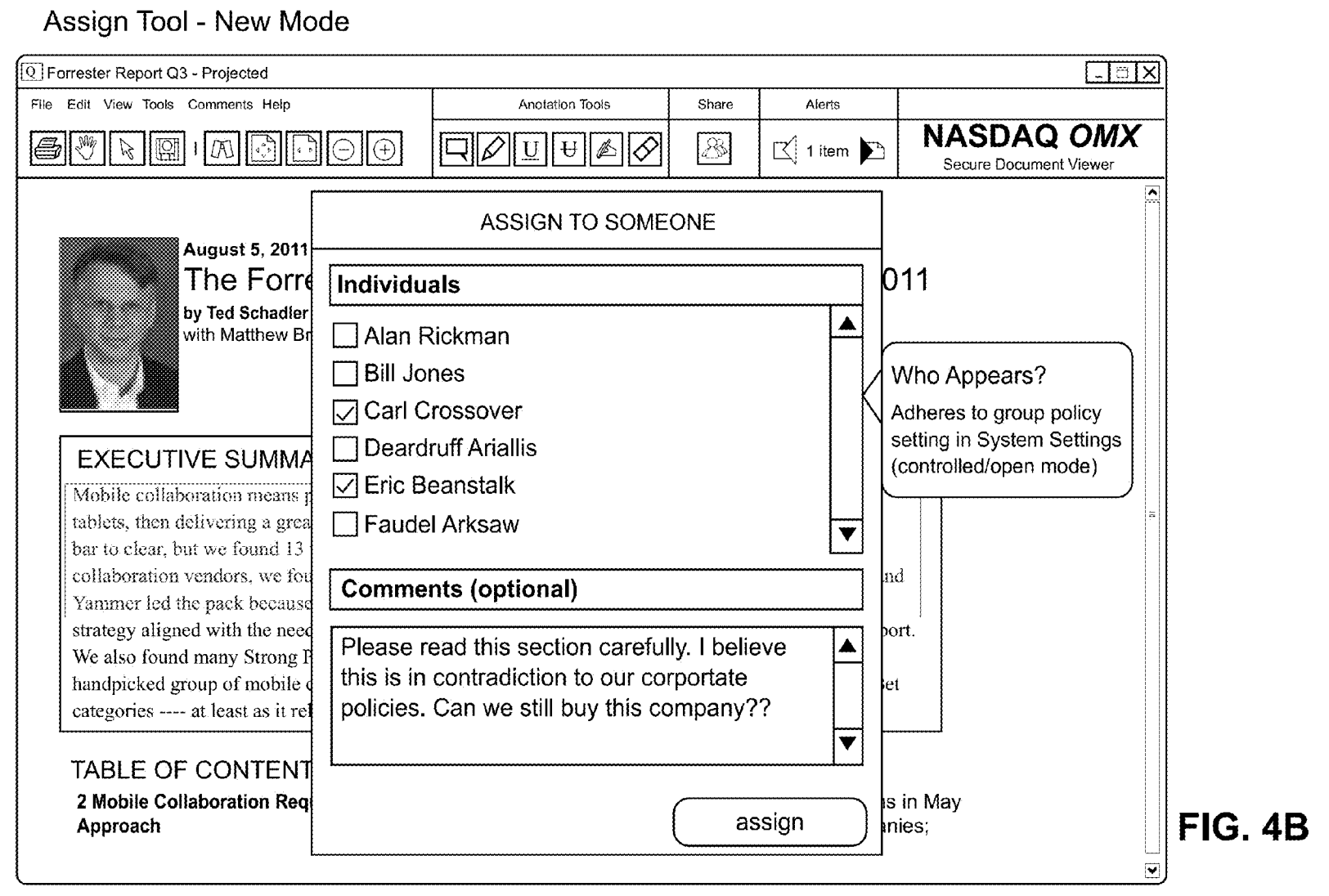

Alternatively, as shown in FIG. 4B, the user may create the annotation and associate it with a portion or section of the document. In FIG. 4B, the lines from "Yammer" to "categories" are all highlighted (e.g., annotated) by the user and associated with a DDDI. In certain examples, the user may "draw" on the document by circling or otherwise marking up the portions that he/she wishes the annotation to be associated with (e.g., drawing an arrow, underlining, strike through, making any type of drawing). Accordingly, various techniques may be implemented to allow a user to select or otherwise specify a portion of a document (or information) that the created annotation is to be associated with.

In step 304, the annotation may be shared by assigning it to another user. This is graphically shown in FIG. 4B with the "Assign to Someone" dialog box. In the above discussed example, Adam may share an annotation with Erica. As described in more detail below, the list of users that is displayed may be controlled via group policy settings such that groups or teams of people can only assign new annotations to other users within their team. In other words, not all of the users of a particular virtual data room may be available for assignment.

In step 306, a notification is sent via email to the user that the annotation is assigned to. Thus, continuing with the above example, Erica may receive an email indicating that Adam has assigned her an annotation that is associated with a particular document. Other forms of notification may also be used. For example, text messages, automated phone calls, notification through a secure email system, etc.

In certain example embodiments, the notification may be associated with a priority and the priority may be used to determine how an alert is sent to a user. For example, regular or low priority notifications may not generate emails, but instead may alert the assigned user through an exemplary virtual data room application (e.g., as shown in the screen shots). In certain instances, assignments that are high priority may be emailed to a specified email address or may trigger a text message or phone call, in certain example embodiments, the priority may be automatically assigned (e.g., as a default).

Figure 4C:
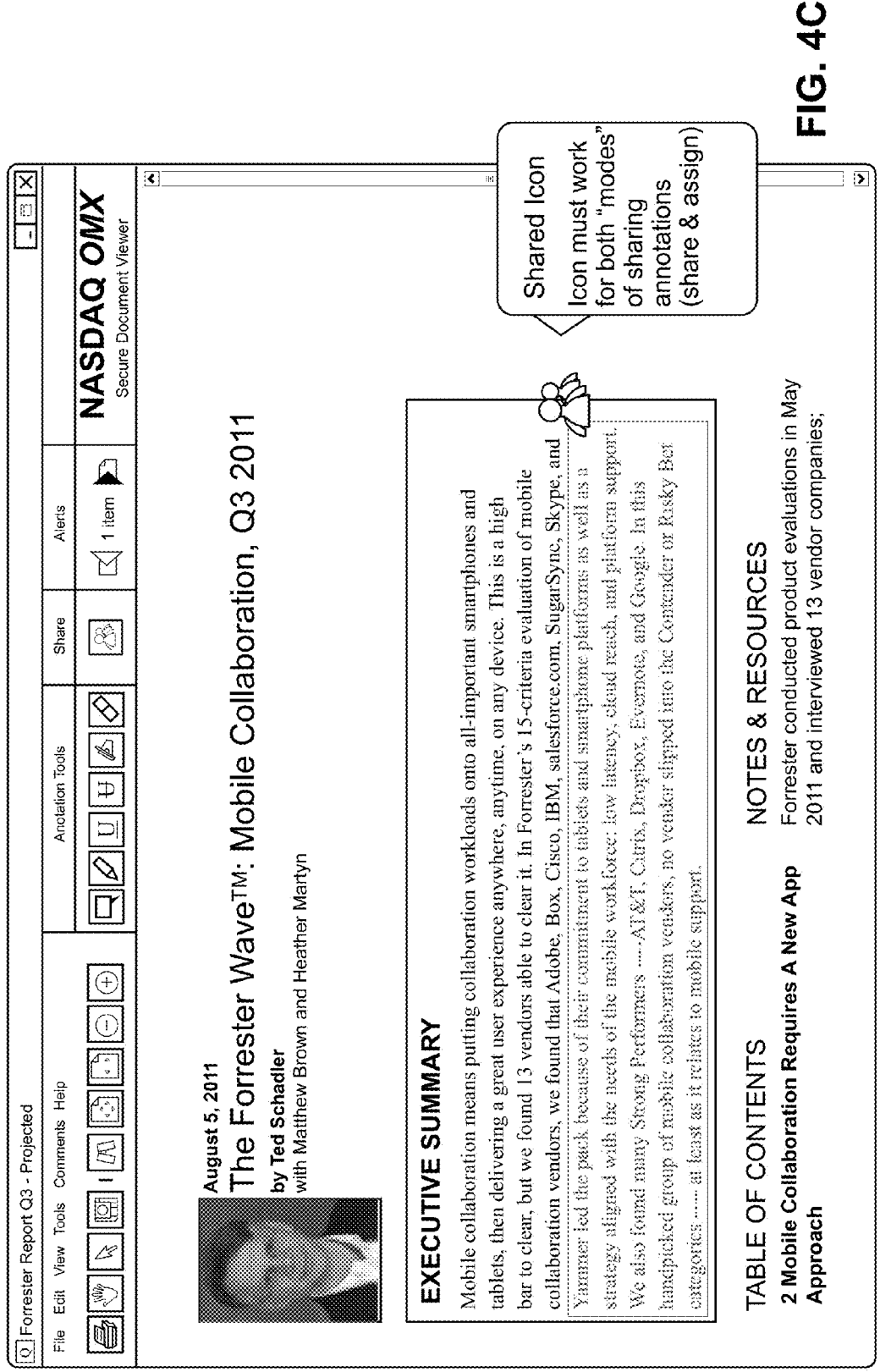
Figure 4D:
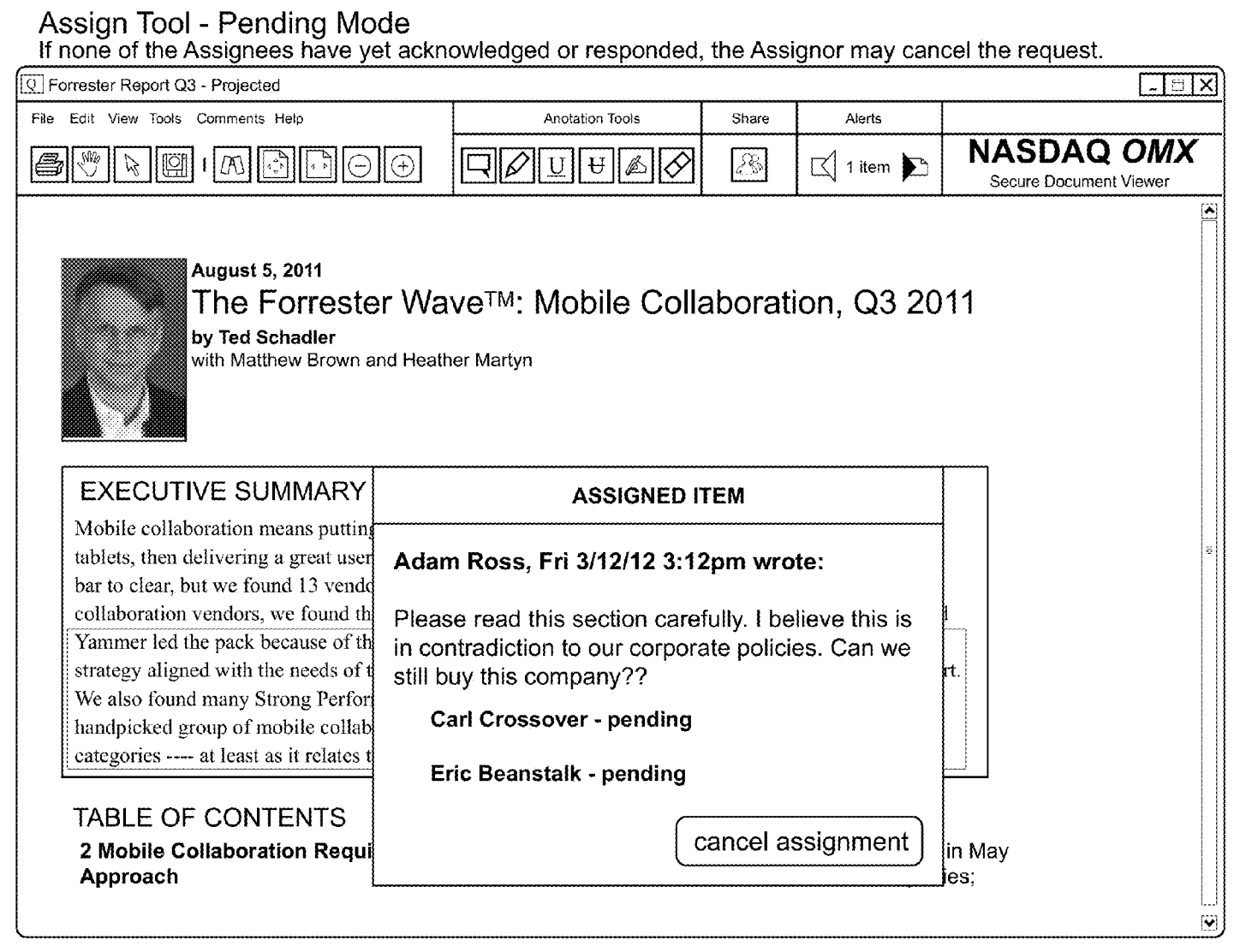

In step 308, the viewer that is used by users for the document in question (e.g., the "The Forrester Wave™: Mobile Collaboration, Q3 2011" in FIG. 4C) may be updated to show that an annotation is now associated with a portion of the document. For example, an icon as shown in FIG. 4C may be used to indicate that an annotation and associated DDDI is present. In certain example embodiments, the annotation may be viewable to all users or may only be viewable to a subset of users that are associated with the document (e.g., assignor users or assignee users).

Figure 4E:
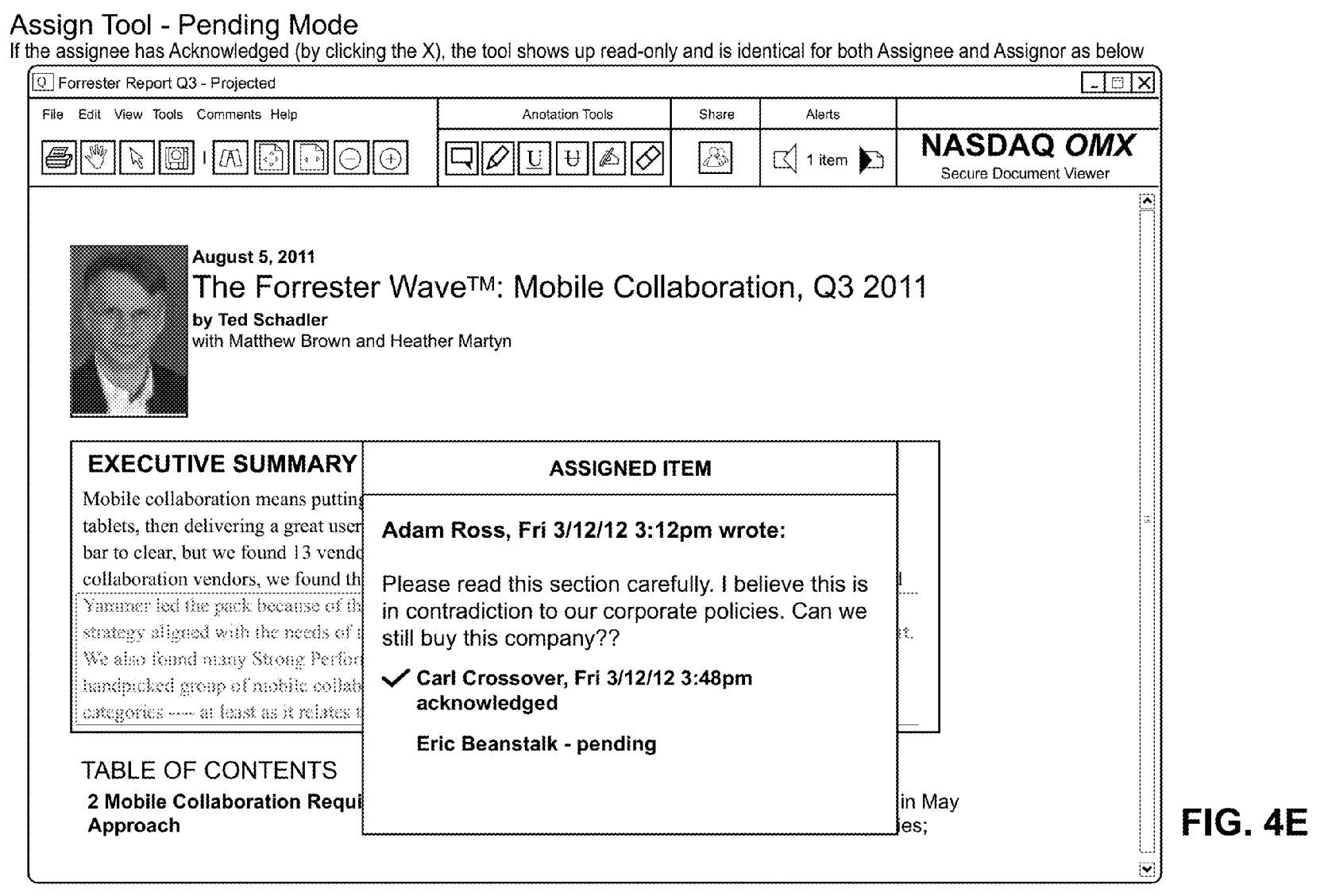
Figure 4F:
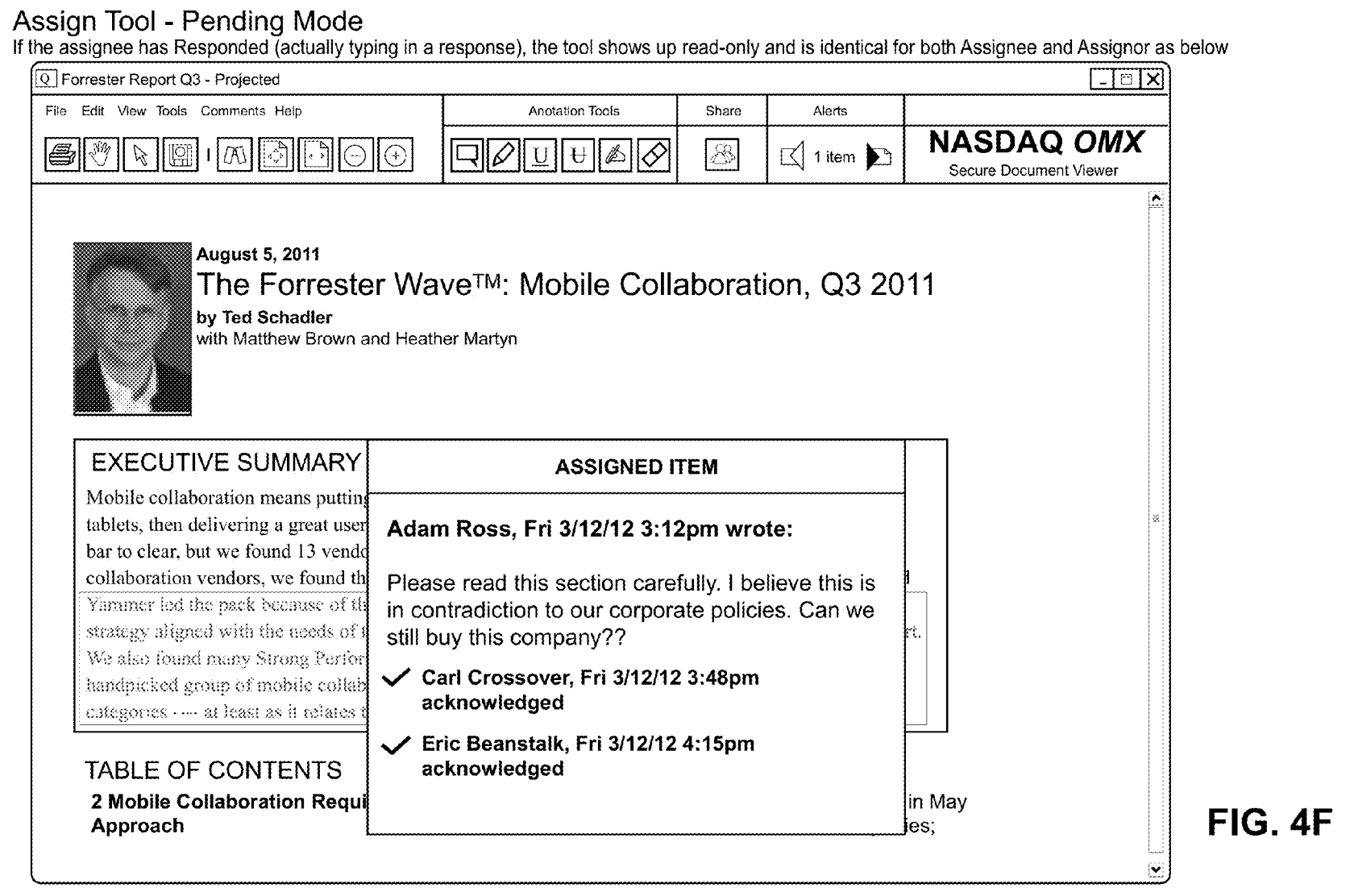

As users reply to or otherwise acknowledge an annotation, the originally created annotation may be updated to show the assignor the updated status. For example, in FIG. 4E the display of the created annotation is updated after "Carl Crossover" acknowledges the annotation (e.g., by hitting an acknowledge button). Similarly, as shown in FIG. 4F, when a user replies, the text of the reply is displayed to the users who open the annotation.

Returning to FIG. 3, in certain instances a user may desire to cancel an annotation, assignment, or a DDDI. However, the system may only allow annotations (or other items) to be canceled/deleted when certain conditions are met. Thus, in step 310 (and shown in FIG. 4D) an assignment or annotation may be canceled. In certain example embodiments, canceling may remove one or more users from the created annotation. If there are no users left after cancellation, then the entire annotation may be canceled. In certain example embodiments the annotation or DDDI may be canceled or otherwise removed from the system. In certain example embodiments, cancellations actions may only be carried out when users have not already responded to the annotation or an action has not already been taken with the created DDDI. For example, after Carl crossover responds as shown in FIG. 4E, the annotation may not be canceled by the assignor. In any event, if the created DDDI and associated annotation is canceled, then in step 312, the originally assigned user may be notified that the DDDI that they were assigned to has been canceled. In certain example embodiments, the system may require that the users enter a reason for canceling the DDDI.

Figure 5:
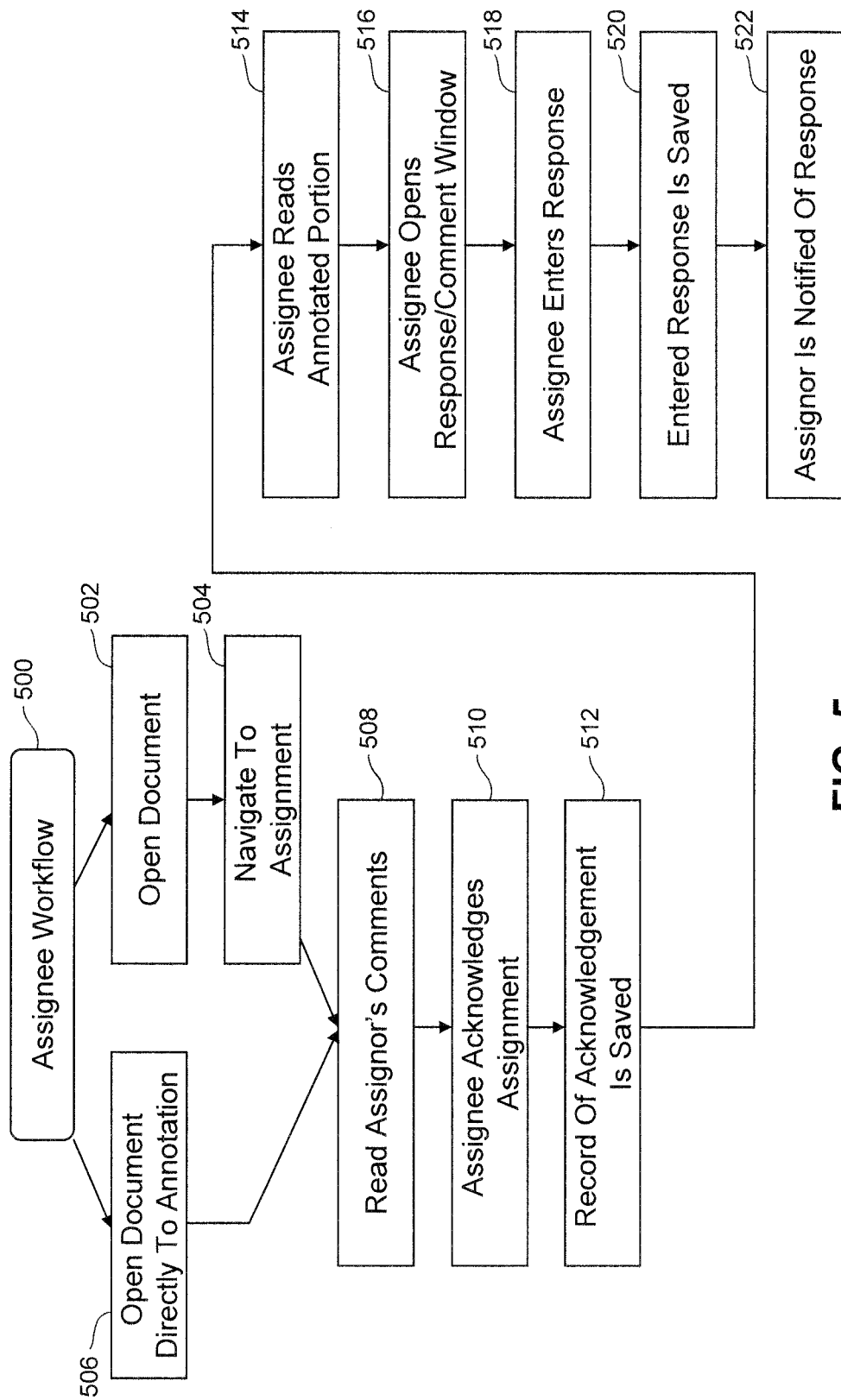
FIG. 5 is a flow chart associated with an example process of an assignee interacting with an example system.

FIG. 5 is a flow chart associated with an example process of an assignee interacting with an example system. FIGS. 6A-6E are screen shots showing the exemplary assignee interaction with an example system. An assignee workflow 500 may begin with the user opening a document directly to annotation in step 506 or opening a document in step 502 and then manually navigating to the assignment in step 504.

As discussed above, assignees may be notified that a new dynamic due diligence item with an associated annotation has been assigned to them. In certain examples, an email message may be sent to a user with a link to open a document. Another example is shown in FIG. 6A, where an alert indication is present within a document viewer. Such indications may allow a user to open and/or consider annotations and their linked documents (or portions thereof) relatively quickly. The alert indication in FIG. 6A shows the number of alerts of the current document and allows users to successively click on the alerts button to jump between multiple alerts (if there is more than one alert for a document).

Figure 6B:
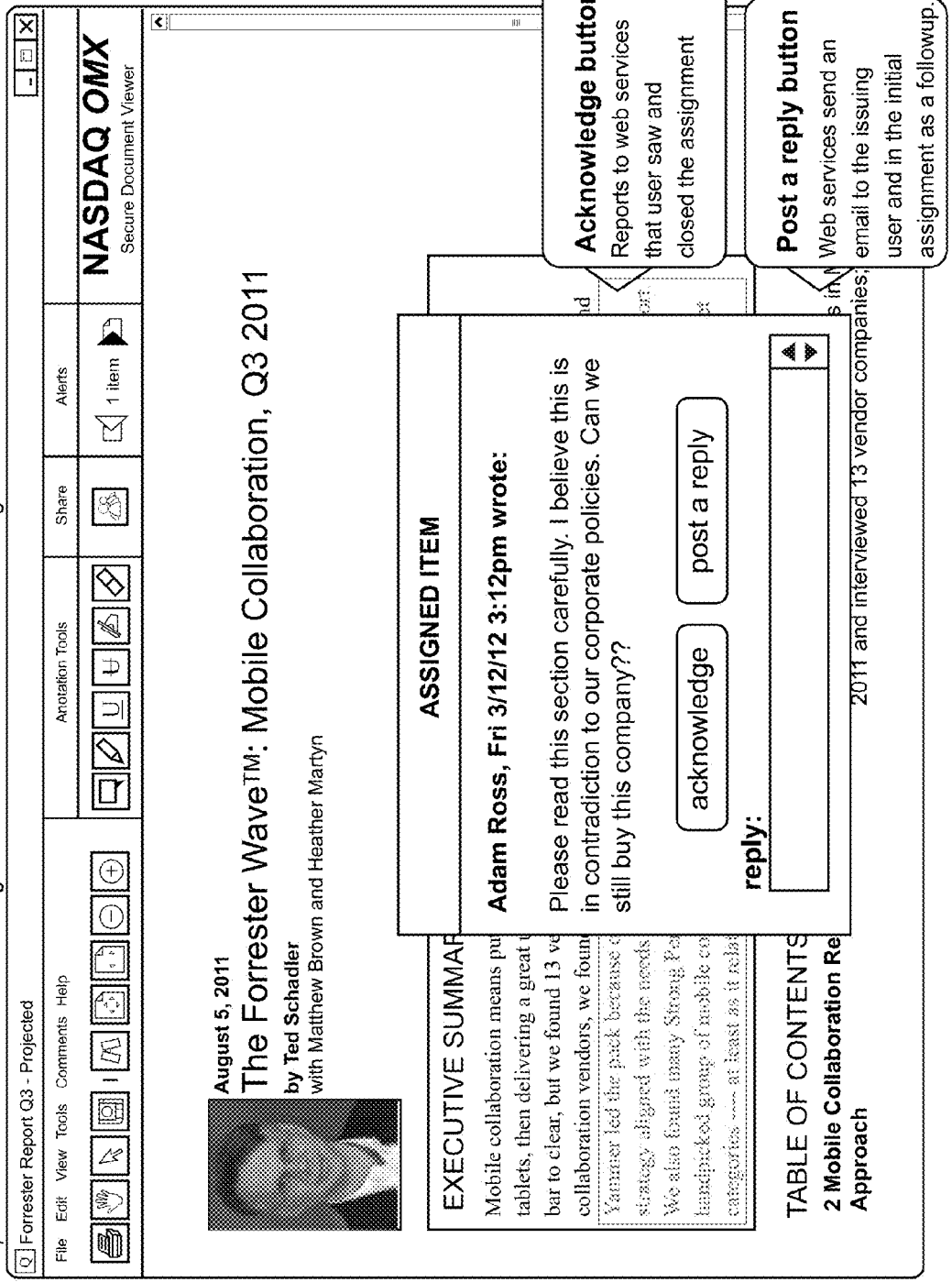

As shown in FIG. 6B, when an alert is presented to a user, the dialog box that is associated with the annotated portion of the document may be placed over the text in question. Thus, the presence of the dialog box may "force" a user to hit the acknowledge button (e.g., an affirmative action that is recordable by the system) in order to read the underlying annotated text. In certain example embodiments, only a portion of the text may be obscured. Alternatively, all of the text may be obscured. Obscuring the text may be accomplished by placing the dialog box over the text or masking (e.g., blurring) the text of the document until the acknowledgement (or other appropriate action) is taken by the user. In other embodiments, the text may be completely visible with the dialog box (and associated features) placed off to the side of the text. In certain example embodiments, the dialog box may take up between 20% and 40% of the space on a given screen. In other embodiments, the control or dialog box may take up the entire screen (e.g., to force the user to acknowledge DDDI).

Continuing with FIG. 6B, an assigned item is presented to a user where the user may read the comments that have been included by the assignor in step 508. The assignee then acknowledges the item by hitting the acknowledge button in step 510. This action is recorded and saved by the system so that there is a record of the assignee acknowledging the item. In certain example embodiments, the assignee may also include a response along with acknowledging.

However, as the text of the annotated portion of the document is obscured it may be difficult for the assignee to provide any comments based on the contents of the annotated portions. Thus, after the item is acknowledged, the dialog box (or other type of user interface control) may be dismissed to allow the assignee to read the annotated portion in step 514 and as shown in FIG. 6C.

Figure 6D:
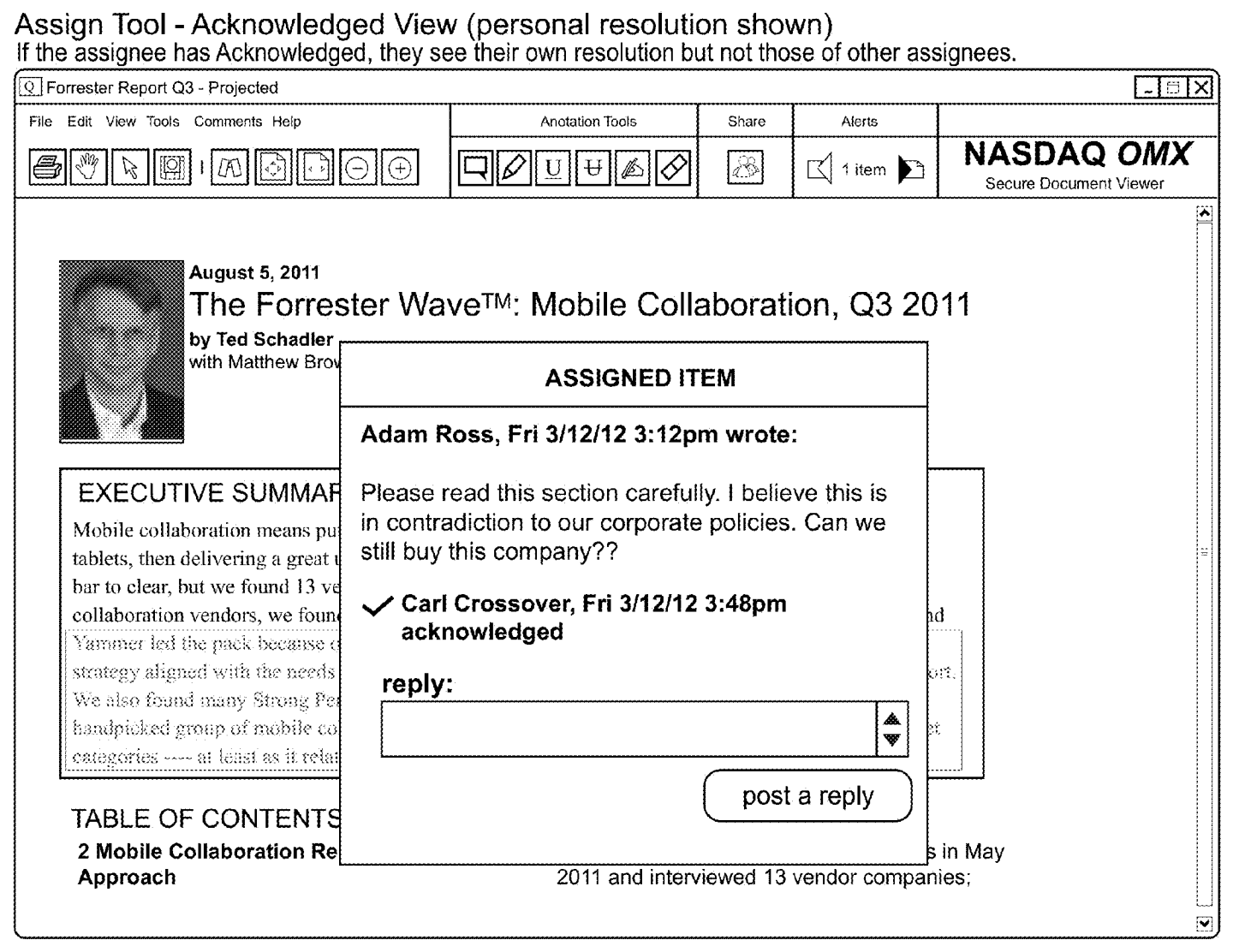

When the item is dismissed, an icon may be placed on the screen to indicate that a DDDI is associated with this particular annotated portion of the document. After considering the annotated portion the assignee may open up the response tool to submit a textual response (in addition to the earlier acknowledgement) in step 516. An example opened response tool is shown in FIG. 6D.

In certain example embodiments, the assignee may see their own responses, but not those from other users that are associated with the item. In certain examples, the users may see all of the other users' actions. In certain examples, the content that is visible is based on who is viewing it. For example, a manager may see the responses of all of his/her subordinates.

With the response tool opened, the assignee can now enter a response in step 518. The response is submitted and saved to the system in step 520. The text of the submitted text of the response is shown in FIG. 6E. Also, the original assignor is now notified that a response from the assignee has been entered in step 522. This notification can be an alert within the viewing application or may be an email or other communication to the original assignor.

Figure 7A:
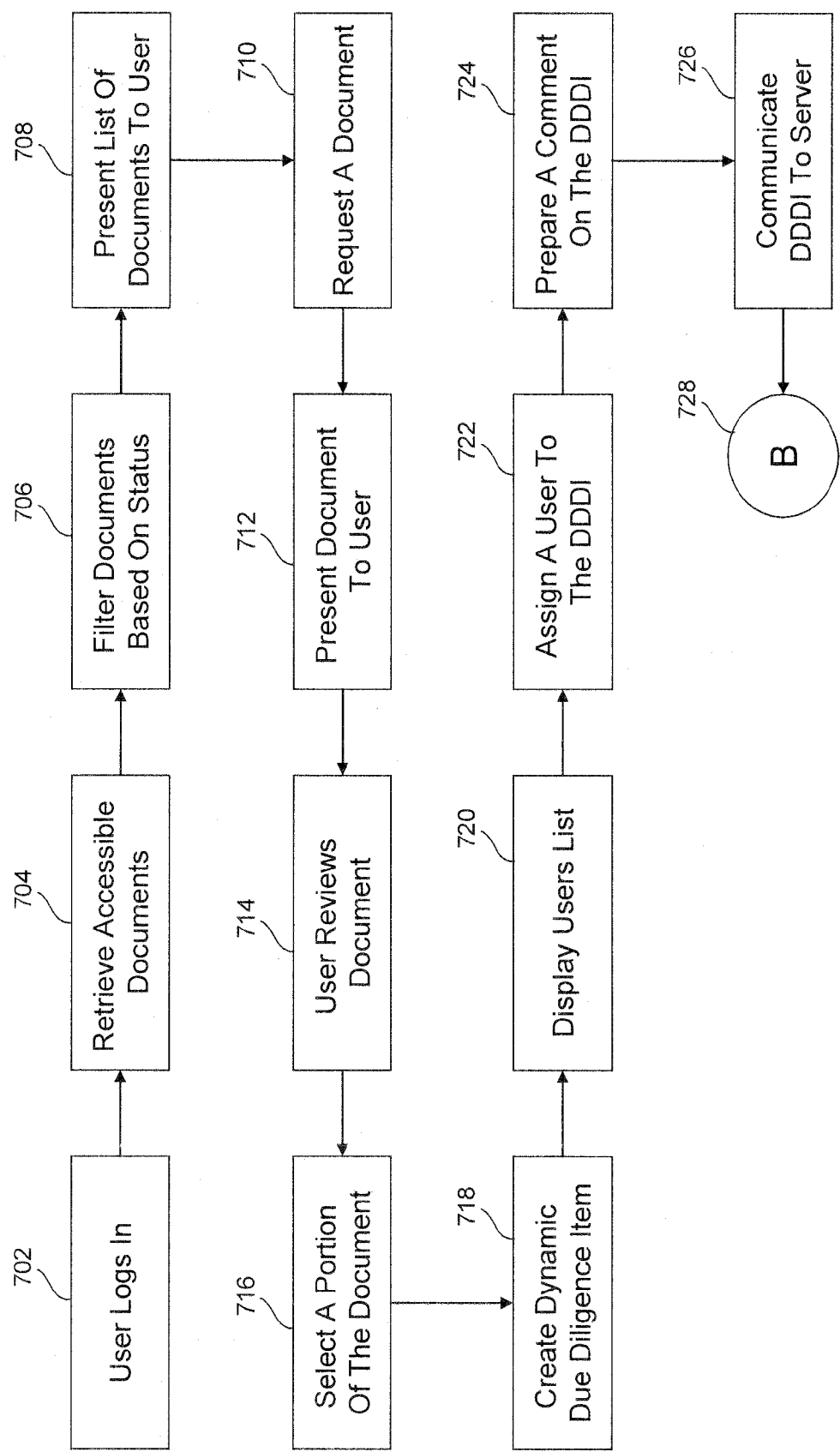
FIG. 7A is a flow chart of an example process associated with an example assignor user interacting with an exemplary dynamic due diligence system.

FIG. 7A is a flow chart of an example process associated with an example assignor user interacting with an exemplary dynamic due diligence system. A dynamic due diligence item may be created by having a user first login (e.g., Authentication API) in step 702. As part of this process, the system retrieves a list of documents (e.g., Document ACL API filters available documents for the user) in step 704. The system further filters the list of documents to display documents the user has not reviewed yet (e.g., Document Reviewed Status API) in step 706 and a list of documents is presented to the user in step 708. The user clicks on a hyperlink in the presentation layer to open a document in step 710. At this point, a Custom Viewer presentation tool is invoked on the users computing resource a personal computer or mobile device) in order to present the requested document to the user.

Figure 7B:
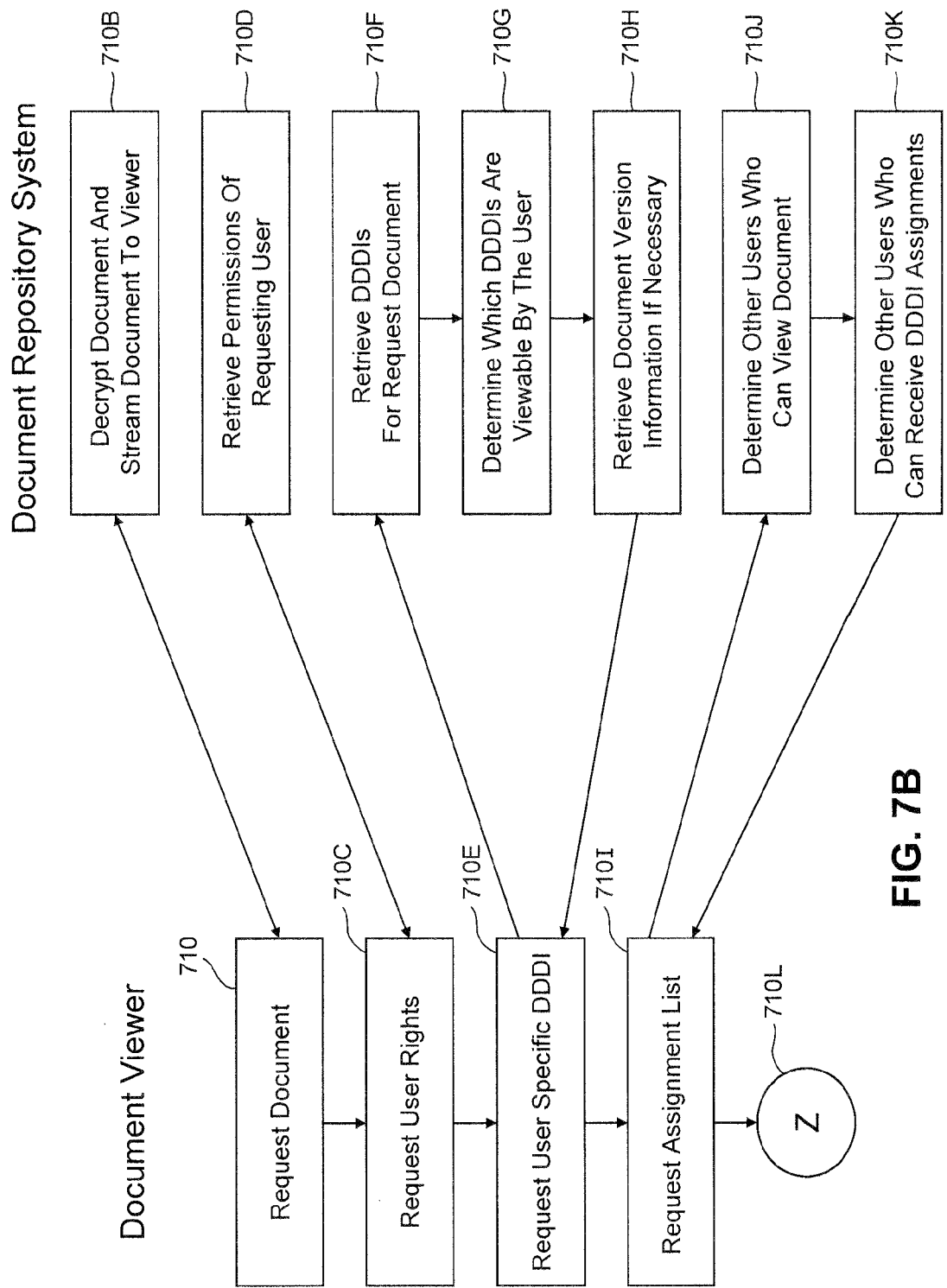
FIG. 7B is a flow chart showing an example communication between a document viewer and a document repository.

FIG. 7B is a flow chart showing example communication between a document viewer (e.g., located on a user's computing resource) and a document repository (e.g., a server system). The Custom Viewer conducts several tasks in parallel (or in sequence) to pull sufficient information for rendering the document on the user's system. The Custom Viewer requests, in step 710, the document content as a bytestream. This may be accomplished at step 710B by the document repository system using the File decrypt API to decrypt the content from long-term Network Attached Storage (NAS) and then stream the resulting content back to the viewer via the Document Streaming API.

The Custom Viewer then requests digital rights management (DRM) security permissions available for the requesting user in step 710C. In response to this request, the server pulls data from the DRM Permissions Database and streams it to the user's computing resources (that is running the document viewer) via the Document DRM Streaming API in step 710D. In step 710E, the Custom Viewer requests annotations (e.g., associated dynamic due diligence items) belonging to the user for display in the requested document. In response, the server pulls this data from the Annotations database for annotations associated with the document in step 710F. The system also determines which DDDIs are associated with the requesting user for this document from the Dynamic Due Diligence Database in step 710G. Also, in step 710H document version information may be retrieved to allow a particular version of a document to be shown to a user (e.g., if there are multiple different versions of a document). All of this collected information is then sent back to the document viewer (e.g., via the Document Annotation Streaming API) on the user's computing resource.

In step 710I, the viewer requests a list of other users that due diligence items can be assigned. As discussed above, this may be a list of users who are in the same department or group (e.g., the information technology (IT) team). In step 710J, the server system pulls the list of other users who also have access to view the document in question by making a call to the Document ACL API which queries the Core System Database. In step 710K, the system cross-references this data with specific rules available in the Dynamic Due Diligence database, and streams the result to the viewer (e.g., via the Document DynDueDiligence Streaming API).

It will be appreciated that the above communications between the viewer and document repository system may be synchronous calls that are implemented serially or may be asynchronous calls that are implemented in parallel, or some combination thereof.

Figure 7C:
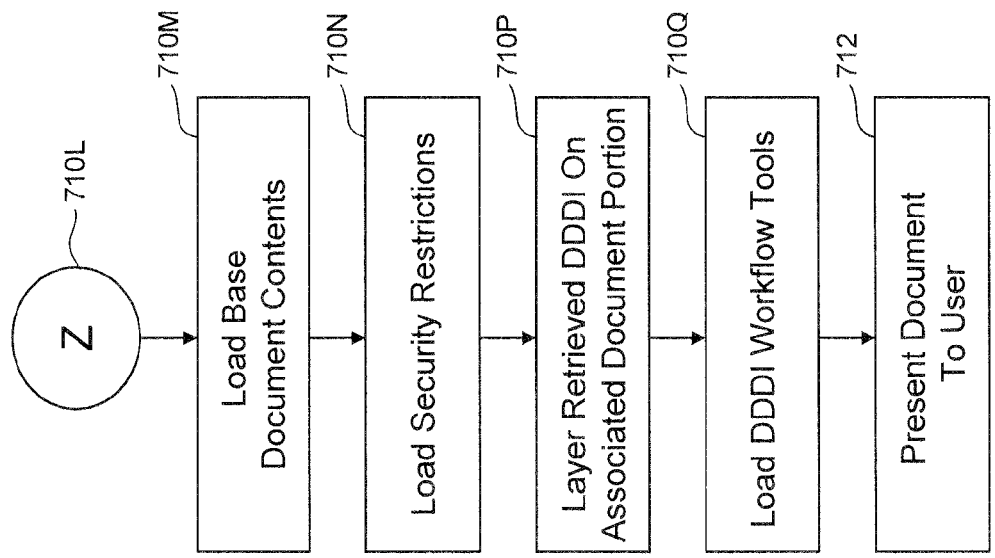
FIG. 7C is a flow chart of an example process for presenting a document to a user.

The user's computing resource running the viewer may then assemble the final document for view by the user by overlaying (or otherwise combining/integrating) data that is associated with the requested document. In this regard, FIG. 7C is a flow chart of an example process for presenting a document to a user. In particular, starting with transition step 710L, the base contents of the document may be loaded in step 710M. This may include pages, images, etc. of the document. In step 710N DRM security restrictions (watermarks, hiding of specific pages or elements, offline viewing rights, expiration policy, print restrictions, etc.) may be loaded by the viewer. In step 710P, annotations/DDDI information may be layered on top of the content of the pages of the document. To the user, the resulting document may appear as one document (e.g., the overlaying process may not be obvious or visible for a user of the document viewer). In step 710Q, the Dynamic Due Diligence workflow tools are loaded. These tools may be loaded based on rules governing who and what methods of document assignment can be conducted within the specific document for the viewing user. Accordingly, the loaded document (and other associated information on annotations/DDDI information) is presented to the user in step 712.

Returning to FIG. 7A, and step 712, after presentation of the document, the user reviews the document in the Custom Viewer in step 714 and sees a section of the document requiring Dynamic Due Diligence. Accordingly, the user selects the annotation tool in the Custom Viewer and highlights a passage within the document in the Custom Viewer in step 716. The user then clicks a Dynamic Due Diligence "Assign" button in the Custom Viewer to create a DDDI item and finalizes it for use within the system in step 718.

Specifically, the Custom Viewer first displays a Dynamic Due Diligence Assignment tool that allows a user to enter certain information related to the creation of a DDDI. The user is presented with a displayed list of users in step 720 that the created DDDI may be assigned to. The assigning user selects one of the displayed users in step 722. Also, the assigning user may prepare a comment that is to be a part of the newly created DDDI in step 724. For example, the comment may be specific instructions for the assigned users on what they are to do for their due diligence review.

The created information is communicated (described in more detail below) to the server in step 726 where it is stored in a database (e.g., the Annotations Database shown in FIG. 2). It will be appreciated, that one or more of the above steps may be optional. For example, the assigning user may skip adding a comment to the created DDDI.

Figure 7D:
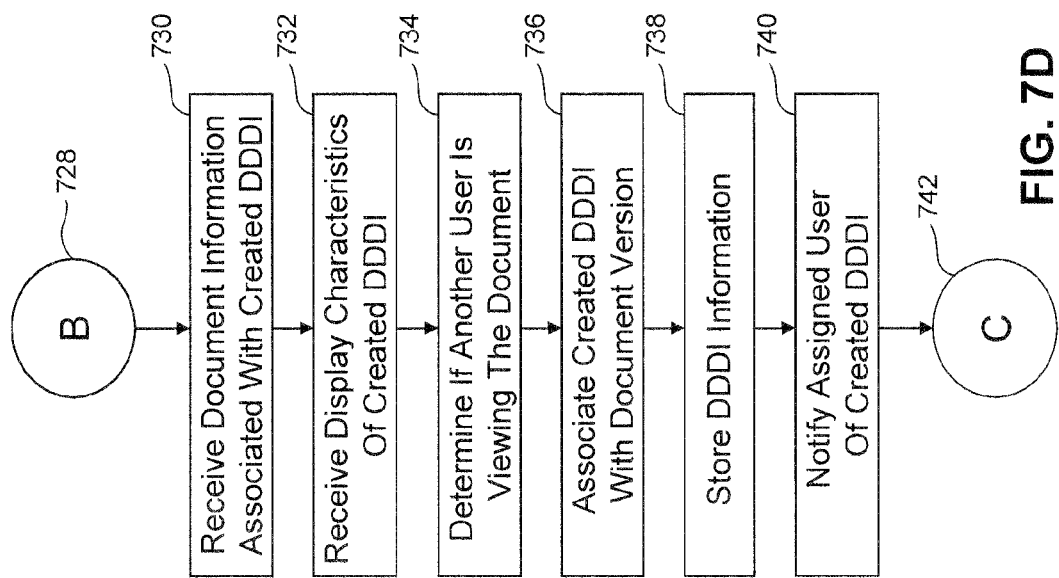
FIG. 7D is a flow chart of an example process of creating a dynamic clue diligence item.

FIG. 7D is a flow chart of an example process of creating a dynamic due diligence item. The communicated information discussed in connection with FIG. 7A may include the details of a new Dynamic Due Diligence Item. In particular, in steps 730 and 732, the viewer on the user's computing resource sends the Document ID, Page Number, and details of the annotation.

According to step 732, the details of the sent DDDI include information on the annotation such as XY starting coordinates; XY ending coordinates; and Vector graphics details (e.g., if the user specified the annotation via freehand drawing). In certain example embodiments, the server receives this information via the Web Services application layer and the business logic layer routes this data to the Annotation Routing API.

In certain example embodiments, in step 734, the server may determine (e.g., via the Annotation Routing API) whether any two users are on different versions of the same document. If this situation occurs, the server may then invoke the Annotation Extraction API, which takes as input the details of the annotation and associated DDDI and returns a mapping of Document Version Numbers, matching Page Numbers, and matching start/end XY coordinates in step 736.

In step 738, the Annotation Routing API stores the annotation data in the Annotations Database and the Dynamic Due Diligence assignments in the Dynamic Due Diligence Database.

In step 740, the Annotation Routing API invokes the User Notification API. This invocation may, in turn, cause the User Notification API to send an email to all recipients to whom the Dynamic Due Diligence item has been assigned. With the DDDI item stored in the server an assigned user may now respond to the contents via the example steps shown in FIG. 7E (e.g., via transition C 742).

Figure 7E:
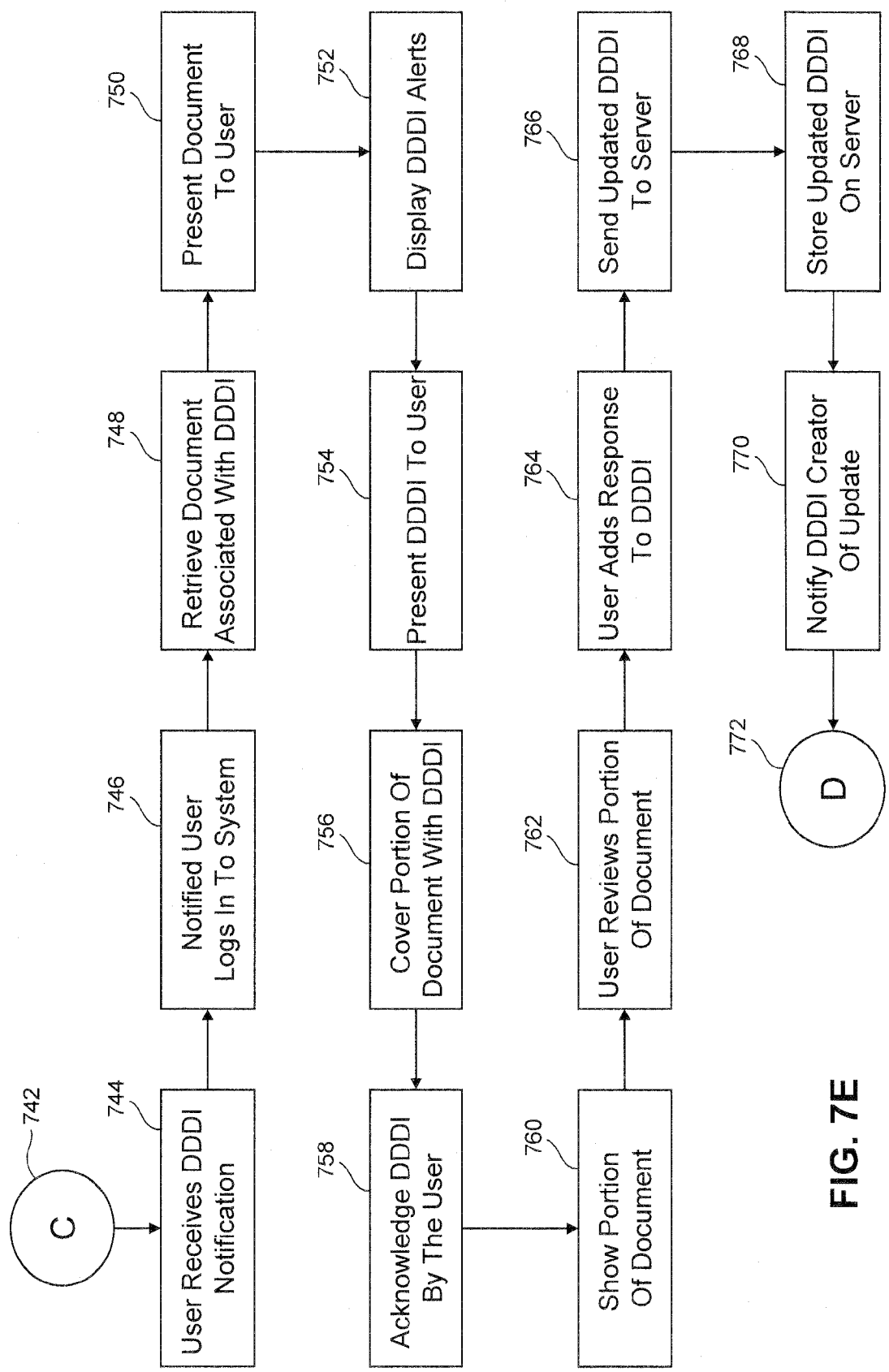
FIG. 7E is a flow chart of an example process associated with an example assignee user interacting with an exemplary dynamic due diligence system.

FIG. 7E is a flow chart of an example process associated with an example assignee user interacting with an exemplary dynamic due diligence system. In step 744, an assignee user receives a dynamic due diligence item notification that indicates that an item has been assigned to him/her and in step 746 logs into the system. In certain example embodiments, the system may retrieve a list of documents that are available to the user (e.g., via the Document ACL API). In certain example embodiments, the system may further filter the list of documents to display those the user needs to review as part of Dynamic Due Diligence (DynDueDil Assignments API). In other words, only those documents that have DDDI items assigned to the assignee user may be displayed. In any event, the user clicks on a hyperlink in the presentation layer of a virtual data room to open a document in step 748. It will be appreciated that other techniques for opening documents (or providing commands/visuals to a user to open a document) may be implemented.

At this point a Custom Viewer presentation tool is invoked on the user's PC or mobile device. As described herein the Custom Viewer requests, assembles, and renders a display of the document along with pertinent support structures in step 750.

The rendering of the display through the document viewer may include having the Custom Viewer request details of the specific annotations assigned to the user within the document, regardless of the fact that such annotations were created by another user in another version of the document. Specifically, the version of the document may play a role in how the annotation/DDDI is displayed, but may not hinder the DDDI from being displayed even if the document versions being worked on are different.

Also, the Custom Viewer's Dynamic Due Diligence workflow tools receive information about the assigned Dynamic Due Diligence annotations. This information may include, for example, page or line numbers of the document that is associated with the annotation. This information may then allow for the overlaid information to be rendered in accordance with how the annotation was originally created.

Upon the opening the document in the Custom Viewer, the Custom Viewer's Dynamic Due Diligence workflow tools alert the user in step 752 that one or more Dynamic Due Diligence items require attention within the document. In certain example embodiments, the alerts are clickable and direct to the user to each Dynamic Due Diligence item within the document with each click.

In step 754, the Dynamic Due Diligence Assignment tool within the Custom Viewer appears as an overlay on top of each assigned annotation. The rendered information of the DDDI is placed over the top of the annotated portion in step 756. In certain example embodiments, as described above, the user must "Acknowledge" having seen the annotation in step 758. After acknowledgement, the portion of the document that was obscured is revealed in step 760 so that the user may review the portion in step 762.

In certain example embodiments, either immediately on or after reviewing the assigned annotation and page contents, the user can provide a supplemental response in the form of a text based response (e.g., in addition to the acknowledgement response) in step 764. For example, the user may click on an icon to re-display the workflow tool for the DDDI associated with a particular annotation. The user may then create a text based response that is to be reviewed by the original assignor (or other users).

This updated information is then sent to the server in step 766. For example, the Custom Viewer may send the Document ID, AnnotationID, the date of Acknowledgement, and Response to the server. It will be appreciated that additional server updates may be performed in response to user actions. For example, when the user acknowledges the DDDI, a response may be sent before sending information on the supplemental response. In certain example embodiments, updates may be sent when a document is closed out or at certain time based intervals (e.g., every minute the document viewer information is synchronized with the server).

In any event, in step 768, the server receives the sent information via the Web Services application layer and/and the business logic layer and routes the data to the Annotation Routing API. The Annotation Routing API then stores the Acknowledgment and Response in the Dynamic Due Diligence Database.

In step 770, the Annotation Routing API invokes the User Notification API to notify relevant users of the updated DDDI information associated with this particular annotation. For example, the original creator of the DDDI may receive an email regarding the acknowledgment and/or updated response. It will be appreciated that such notifications may be configured based on the particular needs of a client. After notifying the creator, the process may then transition, via transition D 772, to approving the status of a DDDI.

Figure 7F:
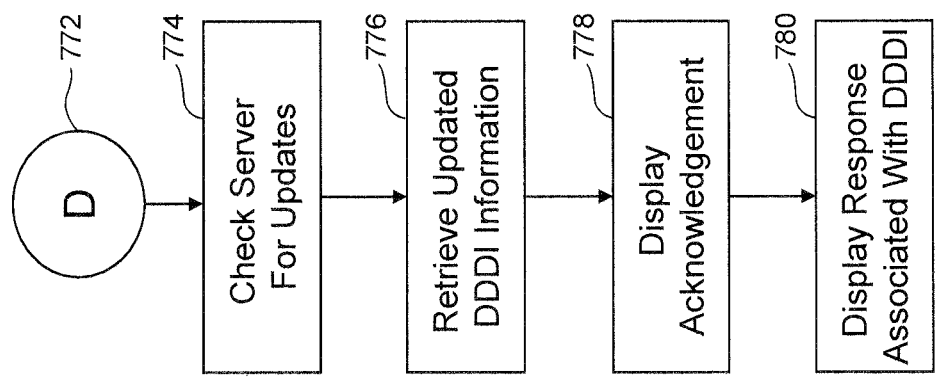
FIG. 7F is a flow chart of an example of updating a dynamic due diligence item.

FIG. 7F is a flow chart of an example of updating a dynamic due diligence item. The Dynamic Due Diligence item creator may or may not receive an email notification (e.g., depending upon client configuration). In step 776, if the Dynamic Due Diligence item creator has the document open in the Custom Viewer already, then the Custom Viewer may poll the system's Web Services layer at regular intervals (e.g., every 15 seconds) to check for updates made to the document. If the Dynamic Due Diligence item creator does not have the document open in the Custom Viewer already, then this data is pulled as part of re-opening the document via step 776.

In the web services layer of the system, as part of these checks, a call is made to the DynDueDil Response API, which pulls data from the Dynamic Due Diligence Database to determine when one or more assignees have "Acknowledged" and/or responded to the Dynamic Due Diligence item. Such details are then streamed to the Custom Viewer via the Annotation Routing API.

Accordingly, in the Viewer, the Dynamic Due Diligence Assignment tool provides an updated status of a given Dynamic Due Diligence item, showing the Dynamic Due Diligence item creator and for each assignee: 1) the Acknowledgement Status (Acknowledged Yes/No and, if Yes, the date may be displayed) in step 778; and 2) the response, if any, typed in by the assignee in step 780.

Thus, in certain example embodiments, users may perform dynamic due diligence through use of workflows, annotations, and the like that are associated with a document (or a piece of information) or portion thereof that is electronically presented to the users.

A dynamic due diligence item may also be associated with a recommendation made by a user associated with the item (e.g., the assignor or assignee). Also, recommendations may take on two or more levels and such recommendations may be collated and presented to users of the system.

Figure 9:
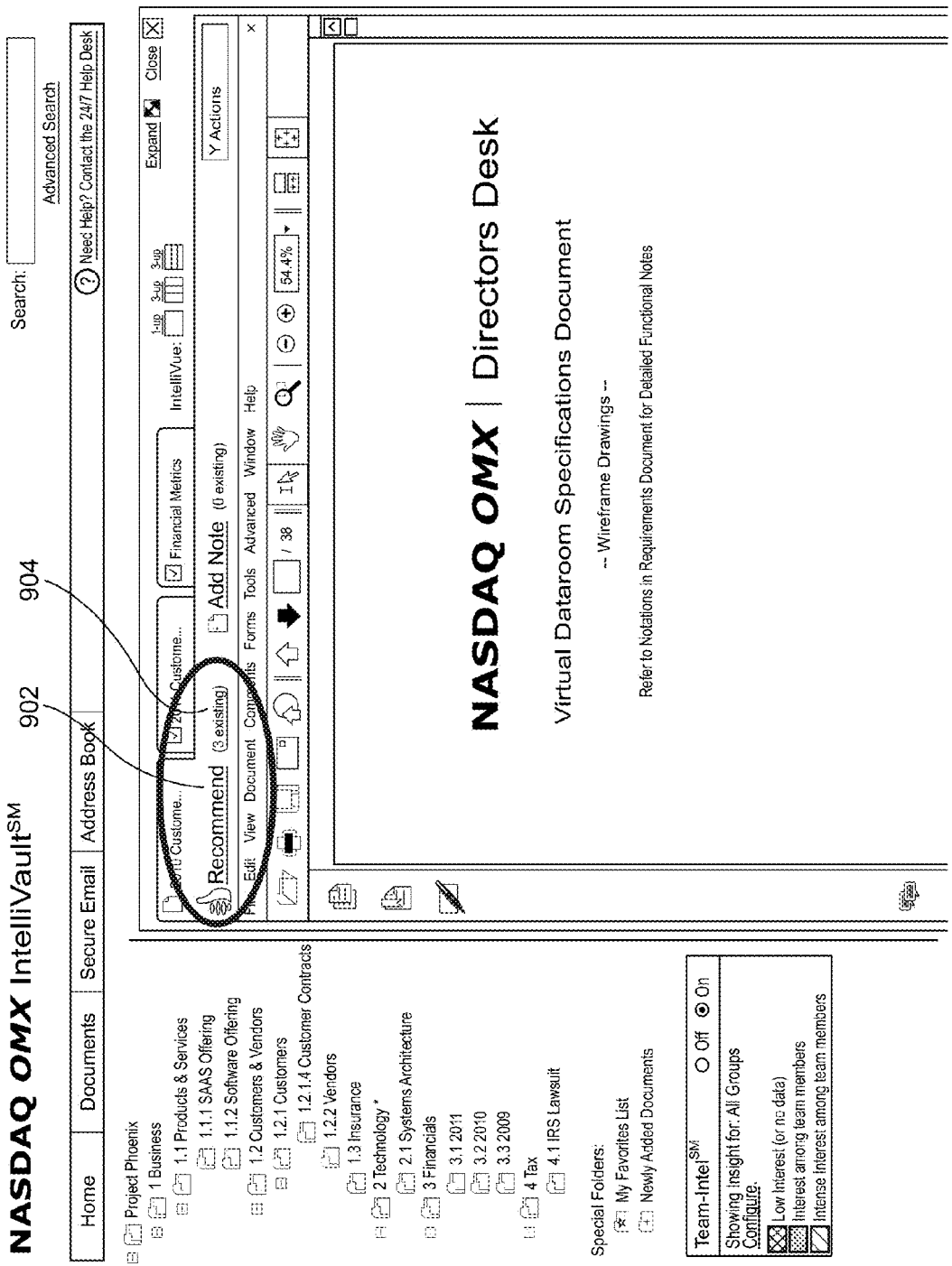
Figure 10:
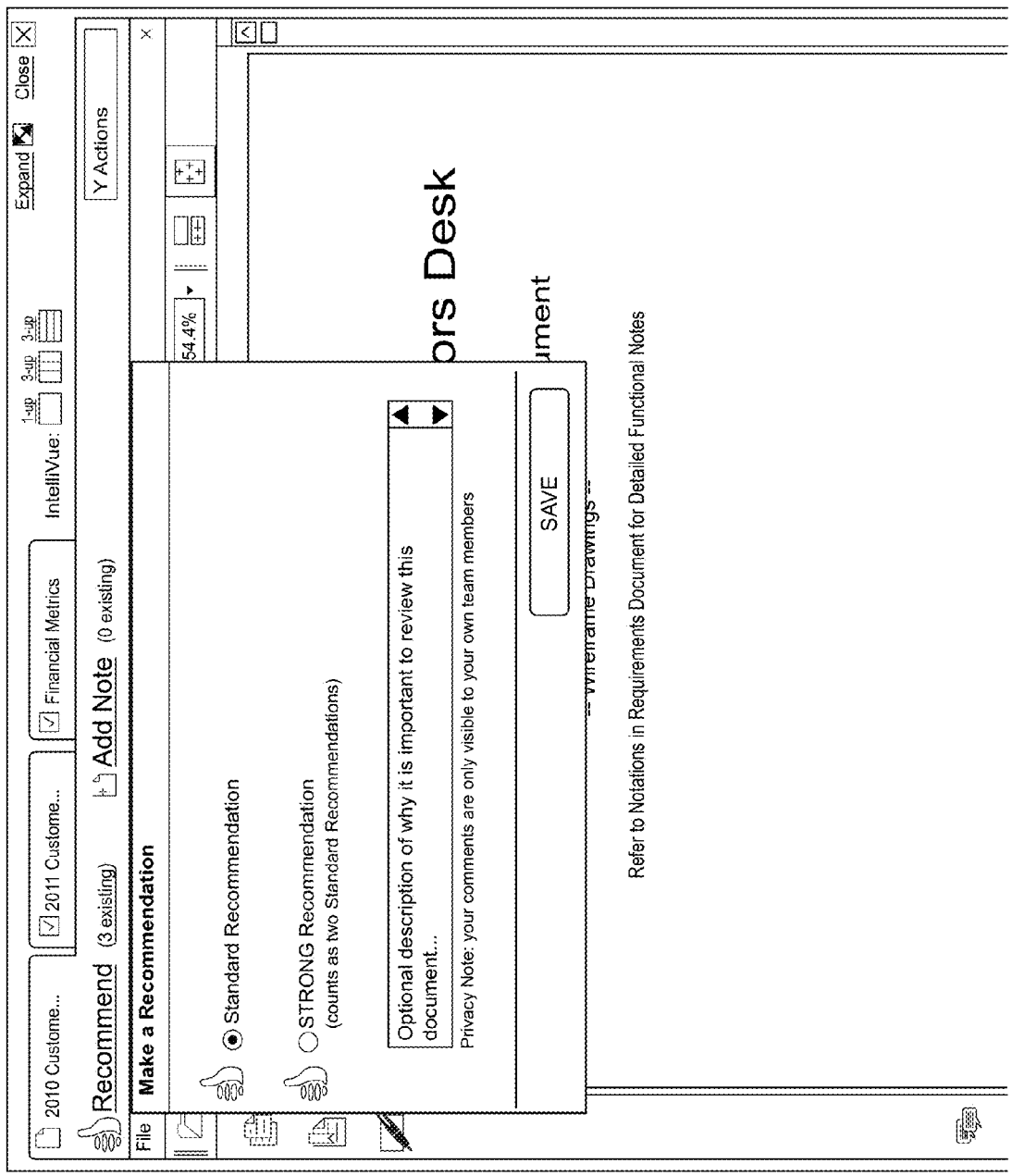

FIG. 8-10 are screen shots of an example recommendation workflow. FIG. 8 is a screen shot of an application program 800 in which users see recommendations related to documents stored in the system. Specifically, documents of the "1.2.1.4 customer contracts" folder 804 are shown in the view to the right of the tree view. Each of the documents has an associated recommendation score that relates to how users of the system have rated each document. Thus, "2010 customer receivables *" has a recommendation score of 8. Such a score may indicate that a document is more important that other documents and may be worthwhile for each team member to review the document. Thus, a recommendation system may be used to provide a more generalized due diligence aspect than the dynamic due diligence items discussed above (e.g., that the recommendation does not need to be assigned to any one user).

FIG. 9 is a screen shot when an individual document is opened according to certain example embodiments. In particular, users may recommend the document via button 902 or may bring up information on how users have recommended the current document via button 904.

FIG. 10 is a screen shot showing a dialog box with a workflow that is displayed when a user desires to recommend a document. As can be seen, there may be two or more levels of recommendation. For example the "standard" recommendation may count for 1 point while a "strong" recommendation may count for two points. It will be appreciated that other levels of recommendation may be used in accordance with the techniques described herein. For example, a negative recommendation option may be added (e.g., −1 point) or a third level of recommendation that is worth 3 points. These points may then be summed or otherwise calculated and displayed to the user in, for example, the screen shown in FIG. 8. Users may also have the option of inputting a description of why it is important for other users to view this particular document. All of this information may be entered by a user and stored to a database system for future use.

The techniques described herein may be implemented on computing systems (e.g., processing systems) that are composed of processors and other components of computer architecture.

Figure 11:
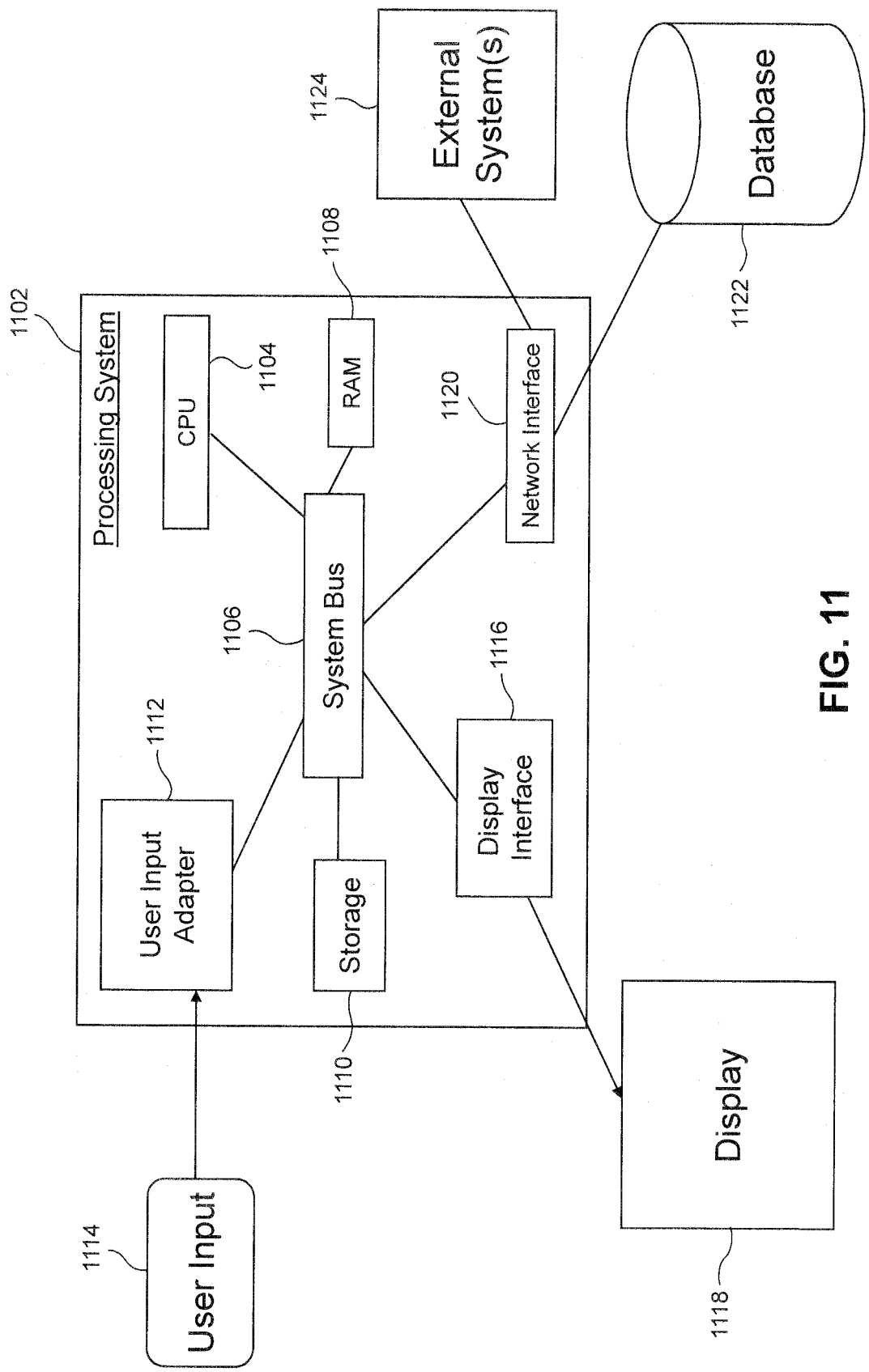
FIG. 11 is a block diagram of an exemplary computing system according to certain example embodiments.

FIG. 11 is a block diagram of an exemplary computing system according to certain example embodiments. A processing system 1102 may include a central processing unit or CPU 1104, a system bus 1106 that communicates with RAM 1108 and storage 1110. The storage 1110 can be magnetic, flash based, solid state, or other storage technology. The system bus 1106 may also communicate with a user input adapter 1112 (e.g., a PS/2 or USB interface) that allows users in input commands to the processing system via a user input device 1114 (e.g., a keyboard, mouse, touch panel, or the like). The results of the processing may be displayed to a user on a display 1118 via a display interface 1116 (e.g., a video card or the like).

The processing system 1102 may also include a network interface 1120 that may facilitate wired (e.g., Ethernet) or wireless communication (WiFi/802.11x protocols, cellular technology, and the like) with external systems 1124 or databases 1122. External systems 1124 may include other processing systems, systems that provide third party services, etc. Here, external systems may also be the client or server system. For example the processing system 1102 may implement functionality of a client system as described herein, thus the external system may be the server system as described herein. Conversely, the processing system 1102 may implement the server system and the external systems may include client systems. External systems may also include network attached storage (NAS) to hold large amounts of data (e.g., thousands or millions of electronic documents). Such external systems for storage along with the internal storage and memory may form a storage system for storing and maintaining information (e.g., documents) that are the subject of a due diligence process. Such a system many communicate with user and respective computing resource (e.g., a client system, terminal, etc) to provide documents and information for review and consideration.

The databases 1122 may include relational, object orientated, or other types of databases for storing information (e.g., such as annotations database in FIG. 2).

In other words, the processes, techniques, and the like, described herein may be implemented on a computing system. Such implementations may then configure or program the processing system to carry out aspects according to certain example embodiments.

In certain example embodiments, a client system implementing a document viewer/reader may be a special document viewer that is used to enforce certain policies on the end user as they read through and interact with the document. For example, the reader may prevent users for locally saving copies of the document. In certain example embodiments, the data that makes up the document that is being displayed may be encrypted when it is temporally stored within the memory of the user's computer system. Such techniques may assist in preventing users from copying data that is being presented through the viewer.

In certain example embodiments, the viewer may have digital rights management (DRM) aspects that control how or what a user can do with a document. For example, users may be barred from printing a displayed document. In certain instances local saves may be authorized, but may be time based such that the local copies are no longer accessible after a certain period of time. In certain instances, such triggers may be tied to when the person logs into/out of the system. Thus, local saving may be allowed for one (or more) sessions of work. In certain instances the saving of a local copy of the document may be more efficient (e.g., if the document is many megabytes in size) that re-downloading the document contents each time the document is accessed. By saving the document locally, annotation changes (or other informational changes associated with the document) may be streamed down separately to the client when such changes are saved to the server system (e.g., when a new DDDI is created for an annotated portion of the document). Accordingly, the viewer may dynamically integrate such changes into the document while it is being displayed on the fly.

In certain example embodiment, watering marking techniques may be employed. In certain example embodiments, the viewer and/or system may track who has opened a particular document, what pages have been presented, how long a particular page was presented, etc. Such information may be relevant in having a comprehensive log associated with the performance of due diligence. For example, after a deal closes if a lawsuit is brought because of an allegation of non-disclosure of particular facts associated with a deal, the system may be able to provide information that user "A" viewed document "X" and page "Y" for "Z" minutes.

In certain example embodiments, the client system may be network terminal that functions to output a display of the document, but does not provide any significant processing power. In other words, the rendering of the document and integration of the annotation and DDDI information may be performed by a server and then streamed for display on the client system. Of course other types of client systems may also interact with a server (e.g., personal computers, mobile devices, etc).

In certain example embodiments, assignee users may reroute assigned items to other users. For example, one user ma not be qualified to answer a particular question associated with the annotated portion of a document. Thus, the user may re-route it to a specialist or may escalate to their manager (who may then re-route to an appropriate person). In certain example embodiments, re-routing (or escalating) may create new DDDIs with the particular annotation. Alternatively, such re-routing may be appended to an already existing DDDI. In certain example embodiments, re-routing a. DDDI may be an event that is recorded by the system (e.g., that can be reported on in the future).

In certain example embodiments, users may share annotated portions of a document with each other, but without the requirement that the shared annotations be later "acknowledged."

In certain example embodiments, a method for creating a workflow assignment for an individual's use of an electronic document management system (EDMS) is provided that comprises the steps of: 1) identifying a specific portion of a specific document in the EDMS; 2) Entering a specific set of instructions dictating exactly what action(s) need to be performed related to the relevant portion of the document; 3) Identifying the individual user to whom this new workflow item is to be assigned; 4) Notifying the individual that they have a new workflow assignment within the EDMS; 5) Modifying the individual's view of the document in such a manner that they can simultaneously or sequentially, but in any case contextually, see the following: a) The specific portion of the document identified as needing their attention as per Step 1 above; b) The instructions entered telling them what action(s) they must perform as per Step 2 above; c) A user interface control element consisting of but not limited to a button, a select list, or a text box that the individual can use to change the status of the workflow assignment.

A further aspect is where the EDMS is specifically identified as belonging to the "virtual data room" subclass of document management systems, implying that the assigned workflows are in relation to the act of performing due diligence on a company, a financial transaction, a regulatory approval, or any other transaction typically performed within a virtual data room.

A further aspect is where the step of identifying a specific portion of a document within the EDMS takes place within a specialized document viewer having a set of unique tools consisting of: 1) A selection tool capable of identifying a word, a phrase, a sentence, a paragraph, or any other text-based content within the document or within a page of the document; 2) A selection tool capable of capturing a set of coordinates to create a "bounding box" that identifies a specific region of a specific page or range of pages within the document; 3) A drawing or writing tool allowing for the addition of new shapes or text-based content to be inserted into or superimposed upon a portion of a page or range of pages within the document; 4) A redaction tool allowing for the strikethrough, removal of, replacement of, or reformatting of specific text-based, image-based, vector-based or object-based content on a page or range of pages within the document.

A further aspect is where the set of instructions may be created through: 1) The use of a text box for typing instructions; 2) The use of a selector such as a dropdown menu, checkbox list, or radio button list for the selection of one or more instructions from a pre-determined plurality of possible options.

A further aspect is where the step of identifying the user to whom the workflow assignment is being assigned: 1) Can be done through a selector control such as a select list, a checkbox list, or a radio button list, allowing for the selection of one or more users from among a plurality of potential users to whom the assignment can be made according to logic determined within the business logic parameters of the EDMS; 2) Can be done through the entering of a user's unique identifying information such as an email address, a network user id, a user name, a first name or last name, or any other identifiable characteristic of the individual recognizable by the EDMS itself or by virtue of application programming interfaces (API's) allowing the EDMS to interface with other electronic systems; 3) Can be done such that only one individual becomes the assignee; 4) Can be done such that several individual users become joint assignees; 5) Can be done such that several individual users become assignees, but with varying levels of priority and workflow existing between and among them; 6) Can be done such that a group representing a collection of individuals becomes the assignee; 7) Can be done such that a role representing an abstract set of users and/or groups as determined by business logic within the EDMS becomes the assignee.

A further aspect is where the act of notifying the individual of the new workflow assignment consists of one of the following: 1) Sending an email or other electronic message to the user; 2) Displaying a notification on a page, control or other graphical element within the EDMS.

A further aspect is where the notification exists within a specialized document viewer consisting of: 1) A visible alert in a prominent area of the document viewer such as the primary toolbar, which is visible on every page within the document and hence is difficult for the individual to overlook; 2) A visible dialog or "alert" that appears before the user is able to navigate through the document or through a certain range of pages or range of content within the document.

A further aspect is where the alert shown to the individual can be acted upon to display additional information and/or take action on the workflow assignment, where such information and/or actions consist of: 1) Displaying a list of workflow assignments within the document; 2) Displaying the page number and other relevant location details of each workflow assignment within the document; 3) Navigating the user to a specific workflow assignment within the document; 4) Navigating the user to each of a plurality of workflow assignments that exist within the document.

A further aspect is where the modification of the individual's view of the document identifies the specific portion of the document needing their attention through the use of a series of markers surrounding the relevant section of the document.

A further aspect is where the instructions telling the individual what action is needed from them appears as a box or dialog superimposed upon or side-by-side next to the specific portion of the document in such a manner that the individual can comprehend that the instructions are specifically referring to this identified portion of the document.

A further aspect is where the control accessible to the individual allows them to change the status of the workflow item to the following: 1) Acknowledged; 2) Acknowledge and Commented On, where a text box allows for the individual to type comments back to the workflow assignment originator; 3) Completed; 4) Reassigned, where the individual can select a different individual as the new Assignee; or 5) in Progress, where some other specific configurable workflow has been invoked, corresponding to a workflow management system within the EDMS.

A further aspect is where each workflow assignment is comprised of: 1) The Assignor; 2) The Assignee(s); 3) The Date of Assignment; 4) The Current Status of the Assignment.

A further aspect is where the list resides within a virtual data room subclass of electronic document management systems.

A further aspect is where a "dynamic due diligence report" is created, where each workflow assignment in the report: 1.) Represents a due diligence action item that must be performed in order for due diligence to be deemed "complete" by the parties using the system; 2) Represents a due diligence action item that did not exist at the onset of the due diligence process, prior to the parties beginning their review of the plurality of due diligence documents within the system; and 3) Represents a due diligence action item that is comprised of a portion of a document but not any document in its entirety.

Certain examples herein are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, the example embodiments herein can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), and an erasable programmable read-only memory (EPROM or Flash memory).

Thus, the invention may be embodied in many different forms, not all of which are described above.

It will be appreciated that the techniques described herein may be applied to a variety of different contexts. For example, actions related to mergers and acquisitions deals, bankruptcy (or other forms of capital restructuring), federal drug administration approval (e.g., where experts review portions of a given submission), licensing/sales deals that require review of the asset being licensed (e.g., patents), or other types of actions/deals.

It is emphasized that the terms "comprises" and "comprising", when used in this application, specify the presence of stated features, integers, steps, or components and do not preclude the presence or addition of one or more other features, integers, steps, components, or groups thereof.

It will be appreciated that aspects of the embodiments described herein may comprise yet further embodiments. Also, the embodiments herein (or aspects thereof) may be combined in various ways to form additional embodiments.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke 35 U.S.C §112, $6^{th}$ paragraph unless the words "means for" or "step for" are used. Furthermore, no embodiment, feature, component, or step in this specification is intended to be dedicated to the public regardless of whether the embodiment, feature, component, or step is recited in the claims.

The particular embodiments described above are merely illustrative and should not be considered restrictive in any way. The scope of the invention is determined by the claims, and all variations and equivalents that fall within the range of the claims are intended to be embraced therein.

The invention claimed is:

1. A system for performing due diligence on a plurality of documents that are electronically stored and accessible to a plurality of users over a computer network, the plurality of users including a first user and a second user, the system comprising:

a storage medium system configured to store the plurality of documents; and a processing system that includes at least one processor, the processing system configured to:

receive a request from a first dynamic due diligence terminal associated with a first user to view a document in the plurality of documents;

retrieve the document from the storage medium system;

display a graphical representation of the document on a display screen at the first dynamic due diligence terminal;

select at least the second user out of the plurality of users based on user input;

create a dynamic due diligence item for use in performing due diligence on the retrieved document, the dynamic due diligence item including a required action that the second user is required to take in order to satisfy the dynamic due diligence item;

assign the created dynamic due diligence item to at least the second user;

associate the created dynamic due diligence item to the document;

store the created dynamic due diligence item to the storage medium system;

display a graphical representation of the document on a display screen at a second dynamic due diligence terminal;

graphically integrate an indication of the dynamic due diligence item into the graphical representation of the document so that the indication is displayed, at least partially, within where the graphical representation of the displayed document is displayed on the display screen of the second dynamic due diligence terminal, where the graphical integration of the indication of the dynamic due diligence item at least partially obscures at least some part of the displayed graphical representation of the document at least until satisfaction of the required action;

after graphical integration of the indication of the dynamic due diligence item, receive input from the second user;

automatically determine whether the required action is satisfied based on the received input;

generate and store an indication, to the storage medium system, that the dynamic due diligence item is satisfied in accordance with satisfaction of the required action of the dynamic due diligence item; and reveal the at least partly obscured part of the displayed graphical representation of the document based on satisfaction of the required action.

2. The system of claim 1, wherein:
the first dynamic due diligence terminal includes a first processor of the at least one processors,
the second dynamic due diligence terminal is remotely located from the first terminal and includes a second processor of the at least one processors,
the processing system includes the first dynamic due diligence terminal, the second dynamic due diligence terminal, and a server system that includes at least a third processor of the at least one processors, and
the first and second dynamic due diligence terminals are configured to communicate with the server system over the computer network,
wherein the created dynamic due diligence item and the document to which the dynamic due diligence item is associated with are stored separately within the storage medium system.

3. The system of claim 1, wherein the required action includes an acknowledgement by the second user of the assignment to the second user.

4. The system of claim 1, wherein the required action includes an answer to a yes/no question by the second user.

5. The system of claim 1, wherein:
the plurality of documents are stored in an encrypted form on the storage medium system, and
the processing system is further configured to decrypt the document before being displayed at the first and/or second dynamic due diligence terminal.

6. The system of claim 1, wherein processing system is further configured to:
annotate a portion of the document based on input from a user from the plurality of users; and
associate the annotated portion with the created dynamic due diligence item.

7. The system of claim 6, wherein a location, on the display screen, of the graphically integrated indication of the dynamic due diligence item is based a location, on the display screen, of the graphical representation of the annotated portion.

8. The system of claim 6, wherein the part of the displayed graphical representation of the document is the annotated portion.

9. The system of claim 1, wherein the dynamic due diligence item further includes comment data, and
the processing system is further configured to:
receive input from the first and/or second user in the form of a comment; and
associate the comment with the created dynamic due diligence item,
wherein display of the indication of the dynamic due diligence item includes display of the stored comment.

10. The system of claim 1, wherein the processing system is further configured to determine the list of users out of the plurality of users that are authorized to be assigned the dynamic due diligence item for the document from the first user.

11. The system of claim 1, wherein the processing system is further configured to receive a recommendation on the document from the first user.

12. The system of claim 11, wherein the received recommendation is for a portion of the document.

13. The system of claim 11, wherein the processing system is further configured to:
calculate a recommendation score for all recommendations associated with the document; and
display the recommendation score to a user in the plurality of users.

14. The system of claim 11, wherein the received recommendation is among at least two possible levels of recommendation.

15. A non-transitory computer readable medium storing computer readable instructions for use with a virtual data room system for conducting dynamic due diligence on information that is segmented into a plurality of different information portions that are stored in a storage medium system that is remotely accessible to a plurality of users, the plurality of users including a first user and a second user, the stored instructions comprising instructions configured to:

receive a first request from a first computing resource that is associated with the first user to retrieve an information portion of the plurality of different information portions stored in the storage medium system;

transmit the requested information portion to the first computing resource for review by the first user;

select a group of users from the plurality of users based on the requested information portion and/or the first user, the group of users including the second user;

receive, from the first computing resource, a created dynamic due diligence item for use in performing due diligence on the information portion, store the created dynamic due diligence item to the storage medium system;

store, to the storage medium system, an assignment of the dynamic due diligence item to the second user, store, to the storage medium system, an association between the created dynamic due diligence item and the requested information portion;

receive a second request from a computing resource that is associated with the second user to retrieve the information portion that is associated with the created dynamic due diligence item;

transmit the information portion to a computing resource used by the second user for review thereon;

retrieve the dynamic due diligence item from the storage medium system, the dynamic due diligence item set to be graphically integrated into a graphical representation of the information portion so that the dynamic due diligence item is displayed, at least partially, within where the graphical representation of the information portion is displayed on a display screen to the second user on the computing resource, the dynamic due diligence item including an input requirement, which is graphically integrated as part of the graphical integration of the dynamic due diligence item, that the second user is required to take in order to satisfy the dynamic due diligence item, where the graphical integration of the indication of the dynamic due diligence item at least partially obscures at least some part of the graphical representation of the information portion at least until satisfaction of the input requirement; and store an indication, to the storage medium system, that the input requirement of the dynamic due diligence item is satisfied when data transmitted from the computing resource indicates that the second user provided input that is in accordance with the input requirement, where the at least partly obscured part of the graphical representation of the information portion is revealed based on satisfaction of the input requirement.

16. The medium of claim 15, wherein the instructions are further configured to send a notification to the second user that the first user created the dynamic due diligence item assigned to the second user.

17. The medium of claim 15, wherein the input requirement is acknowledgment of the dynamic due diligence item by the second user.

18. The medium of claim 15, wherein the instructions are further configured to:
encrypt the plurality of information portions;
responsive to a request for at least one of the information portions, decrypt the at least one of the information portions; and
stream the decrypted at least one of the information portions to a computing system used by at least one of the plurality of users.

19. The medium of claim 15, wherein the instructions are further configured to:
receive annotation data from the first computing resource that some part of the information portion has been annotated by the first user; and
store, to the storage medium system, the annotation data along with an association to the dynamic due diligence item.

20. The medium of claim 15, wherein the instructions are further configured to receive a recommendation to the information portion.

21. The medium of claim 15, wherein the instructions are further configured to associate the recommendation to an annotated part of the information portion.

22. A method of conducting due diligence on a plurality of files by a plurality of remotely connected users, the plurality of files being stored on a storage medium system of a virtual data room system that includes at least one processor, the plurality of files including a first file, the plurality of remotely connected users including a first user and a second user, the method comprising:
receiving a first request, at the virtual data room system, from the first user using a first remote computer system to view the first file stored in the storage medium system;
transmitting, from the virtual data room system, the requested first file to the first remote computer system for review by the first user;
receiving, at the virtual data room system, a created dynamic due diligence item that is for conducting due diligence on the first file, the created dynamic due diligence item being associated with the first file and assigned to at least the second user;
storing, via the at least one processor and to the storage medium system, the created dynamic due diligence item separately from the first file that is also stored in the storage medium system;
receiving a second request from the second user to view the first file that is associated with the created dynamic due diligence item;
transmitting, from the virtual data room system, the first file to a second remote computer system for review by the second user thereon;
retrieving, via the at least one processor, the dynamic due diligence item from the storage medium system, and transmitting the separately stored dynamic due diligence item to the second remote computer where an indication of the dynamic due diligence item is set to be graphically integrated into a graphical representation of contents of the first file so that the indication is displayed, at least partially, within where the graphical representation of the contents of the first file are displayed on a display screen to the second user on the second remote computer system, the dynamic due diligence item including an input requirement, which is graphically integrated as part of the graphical integration of the indication, that the second user is required to take in order to satisfy the dynamic due diligence item; and
storing an indication, to the storage medium system, that the input requirement of the dynamic due diligence item is satisfied when data transmitted from the second remote computer system indicates that the second user provided input that is in accordance with the input requirement.

23. The method of claim 22, wherein the first file is encrypted on the storage medium system, the method further comprising decrypting the first file before transmission to a remote computing system.

24. The method of claim 22, wherein the indication is set to be overlaid over at least some of the contents of the first file.

25. The method of claim 22, further comprising:
receiving annotation data from the first remote computer system that relates to the first user having annotated a portion of the first file; and
store, to the storage medium system, the annotation data along with an association to the dynamic due diligence item.

26. The method of claim 25, wherein when the first file is displayed to the second user on the second remote computing system, at least a part of the portion of the first file annotated by the first user is obscured by the presentation of the dynamic due diligence item on the second remote computer system until the second user satisfies the dynamic due diligence item with the input requirement.

* * * * *